US012595066B1

(12) United States Patent
Sibbach et al.

(10) Patent No.: US 12,595,066 B1
(45) Date of Patent: Apr. 7, 2026

(54) BLENDED WING AIRCRAFT

(71) Applicant: General Electric Company, Evendale, OH (US)

(72) Inventors: Arthur William Sibbach, Boxford, MA (US); Brandon Wayne Miller, Middletown, OH (US); Jeffrey Donald Clements, Mason, OH (US); Daniel Alan Niergarth, Norwood, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/344,831

(22) Filed: Sep. 30, 2025

Related U.S. Application Data

(63) Continuation of application No. 19/022,123, filed on Jan. 15, 2025, now Pat. No. 12,448,134.

(51) Int. Cl.
B64D 27/14 (2006.01)
B64D 29/04 (2006.01)
B64D 33/04 (2006.01)
B64C 39/10 (2006.01)

(52) U.S. Cl.
CPC ............. B64D 27/14 (2013.01); B64D 29/04 (2013.01); B64D 33/04 (2013.01); *B64C 2039/105* (2013.01)

(58) Field of Classification Search
CPC ........ B64D 27/14; B64D 29/04; B64D 33/04; B64C 2039/105
See application file for complete search history.

(56) References Cited

U.S. PATENT DOCUMENTS

| | | | |
|---|---|---|---|
| 2,406,506 | A | 8/1946 | Northrop |
| 2,504,137 | A | 4/1950 | Lewis |
| 4,019,699 | A | 4/1977 | Wintersdorff et al. |
| 5,897,078 | A | 4/1999 | Burnham et al. |
| 6,382,562 | B1 | 5/2002 | Whitlock et al. |
| 6,568,632 | B2 | 5/2003 | Page et al. |
| 6,708,924 | B2 | 3/2004 | Page et al. |
| 6,851,650 | B2 | 2/2005 | Sankrithi |
| 6,923,403 | B1 | 8/2005 | Dizdarevic et al. |
| 7,509,797 | B2 | 3/2009 | Johnson |
| 7,644,888 | B2 | 1/2010 | Eakins et al. |
| 7,665,689 | B2 | 2/2010 | McComb |
| 7,793,884 | B2 | 9/2010 | Dizdarevic et al. |
| 8,104,717 | B2 | 1/2012 | Wakayama et al. |

(Continued)

FOREIGN PATENT DOCUMENTS

| | | |
|---|---|---|
| CN | 215064070 U | 12/2021 |
| FR | 2909358 A1 | 6/2008 |

(Continued)

OTHER PUBLICATIONS

Koenig, Air Force Awards a Start-Up Company $235 Million to Build an Example of a. Sleek New Plane, AP News, 2023, 2 Pages. https://apnews.com/article/air-force-aviation-streamlined-plane-blended-wing-2a1704dbe8a3ac112f36220eafe291fa.

*Primary Examiner* — Tye William Abell
(74) *Attorney, Agent, or Firm* — Dority & Manning, P.A.

(57) ABSTRACT

A blended wing aircraft is provided, including a body having a fuselage and a pair of wings extending outward from the fuselage; and an aircraft engine defining an outlet and including a thrust reverser assembly, the thrust reverser assembly including a deployable structure extending less than 360 degrees around the outlet.

15 Claims, 19 Drawing Sheets

(56)  References Cited

U.S. PATENT DOCUMENTS

| | | | |
|---|---|---|---|
| 8,128,023 B2 | 3/2012 | Cazals | |
| 8,251,310 B2 | 8/2012 | Marche et al. | |
| 8,317,129 B1 | 11/2012 | Lawson et al. | |
| 8,366,050 B2 | 2/2013 | Odle et al. | |
| 8,616,492 B2 | 12/2013 | Oliver | |
| 9,016,040 B2 | 4/2015 | Stuart et al. | |
| 9,567,075 B2 | 2/2017 | Tighe | |
| 9,815,559 B2 | 11/2017 | Moxon | |
| 10,711,631 B2 | 7/2020 | Suciu et al. | |
| 11,247,776 B2 | 2/2022 | Princen et al. | |
| 11,312,491 B2 | 4/2022 | Morris et al. | |
| 11,396,365 B2 | 7/2022 | Page | |
| 11,453,483 B2 | 9/2022 | Page | |
| 11,498,660 B2 | 11/2022 | Florea et al. | |
| 11,511,854 B2 | 11/2022 | Baity et al. | |
| 11,572,838 B2 | 2/2023 | Miller et al. | |
| 11,597,501 B2 | 3/2023 | Page | |
| 11,597,510 B2 | 3/2023 | Robertson et al. | |
| 11,608,173 B2 | 3/2023 | McCullough et al. | |
| 11,827,339 B1 | 11/2023 | Page | |
| 11,878,798 B2 | 1/2024 | Atreya et al. | |
| 11,926,410 B2 | 3/2024 | Page et al. | |
| 2007/0023571 A1* | 2/2007 | Kawai | B64D 27/16 |
| | | | 244/119 |
| 2008/0121756 A1* | 5/2008 | McComb | B64C 15/02 |
| | | | 244/60 |
| 2010/0108802 A1* | 5/2010 | Marche | B64D 27/20 |
| | | | 244/54 |
| 2011/0271824 A1 | 11/2011 | Wahlquist | |
| 2014/0150403 A1* | 6/2014 | Stuart | F02K 1/72 |
| | | | 60/204 |
| 2016/0009391 A1 | 1/2016 | Friesel | |
| 2016/0122005 A1 | 5/2016 | Florea et al. | |
| 2016/0144972 A1 | 5/2016 | Florea et al. | |
| 2018/0362169 A1 | 12/2018 | Du | |
| 2019/0276135 A1 | 9/2019 | Merkensteijn, IV | |
| 2020/0331591 A1 | 10/2020 | Page et al. | |
| 2022/0033067 A1* | 2/2022 | Page | B64D 33/04 |
| 2022/0194569 A1 | 6/2022 | Georgeson et al. | |
| 2023/0002037 A1 | 1/2023 | Page | |
| 2023/0029560 A1 | 2/2023 | Stefes | |
| 2023/0242254 A1 | 8/2023 | Page | |
| 2023/0278706 A1 | 9/2023 | Page et al. | |
| 2023/0322382 A1 | 10/2023 | Dindar et al. | |
| 2024/0253773 A1* | 8/2024 | Page | B64D 29/04 |

FOREIGN PATENT DOCUMENTS

| | | | |
|---|---|---|---|
| FR | 2938823 A1 | 5/2010 | |
| FR | 2938824 A1 | 5/2010 | |
| GB | 759491 A | 10/1956 | |
| WO | WO2007/104940 A1 | 9/2007 | |
| WO | WO2021/118401 A1 | 6/2021 | |

* cited by examiner

BLENDED WING AIRCRAFT

CROSS-REFERENCE TO RELATED APPLICATIONS

This application is a continuation application of U.S. application Ser. No. 19/022,123 filed Jan. 15, 2025, which is hereby incorporated by reference in its entirety.

FIELD

The present disclosure relates to a blended wing aircraft.

BACKGROUND

Traditional aircraft designs include a fuselage and a pair of wings. The fuselage is a central body of the aircraft that holds passengers, cargo, equipment, and the like. The wings are attached to the fuselage and are the primary lift-generating surfaces, particularly during constant-altitude flight operations. The aircraft can include engines mounted to the wings to generate thrust for the aircraft, and a tail assembly having a vertical stabilizer and a horizontal stabilizer for vector control. While such an aircraft design is a well-established and proven design, improvements to allow for increased efficiency and cargo utilization would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

FIG. 3 is presented in two subfigures, FIGS. 3A and 3B.

FIG. 4 is presented in two subfigures, FIGS. 4A and 4B.

FIG. 6 is presented in three subfigures, FIGS. 6A, 6B, and 6C.

FIG. 8 is presented in two subfigures, FIGS. 8A and 8B.

FIG. 13 is presented in three subfigures, FIGS. 13A, 13B, and 13C.

FIG. 14 is presented in five subfigures, FIGS. 14A, 14B, 14C, 14D, and 14E. FIG. 14E is exactly the same as FIGS. 14B and 14C, but includes all engines on the top sides of the respective wings.

FIG. 15 is presented in two subfigures, FIGS. 15A and 15B.

FIG. 16 is presented in two subfigures, FIGS. 16A and 16B.

DETAILED DESCRIPTION

Figure 1:
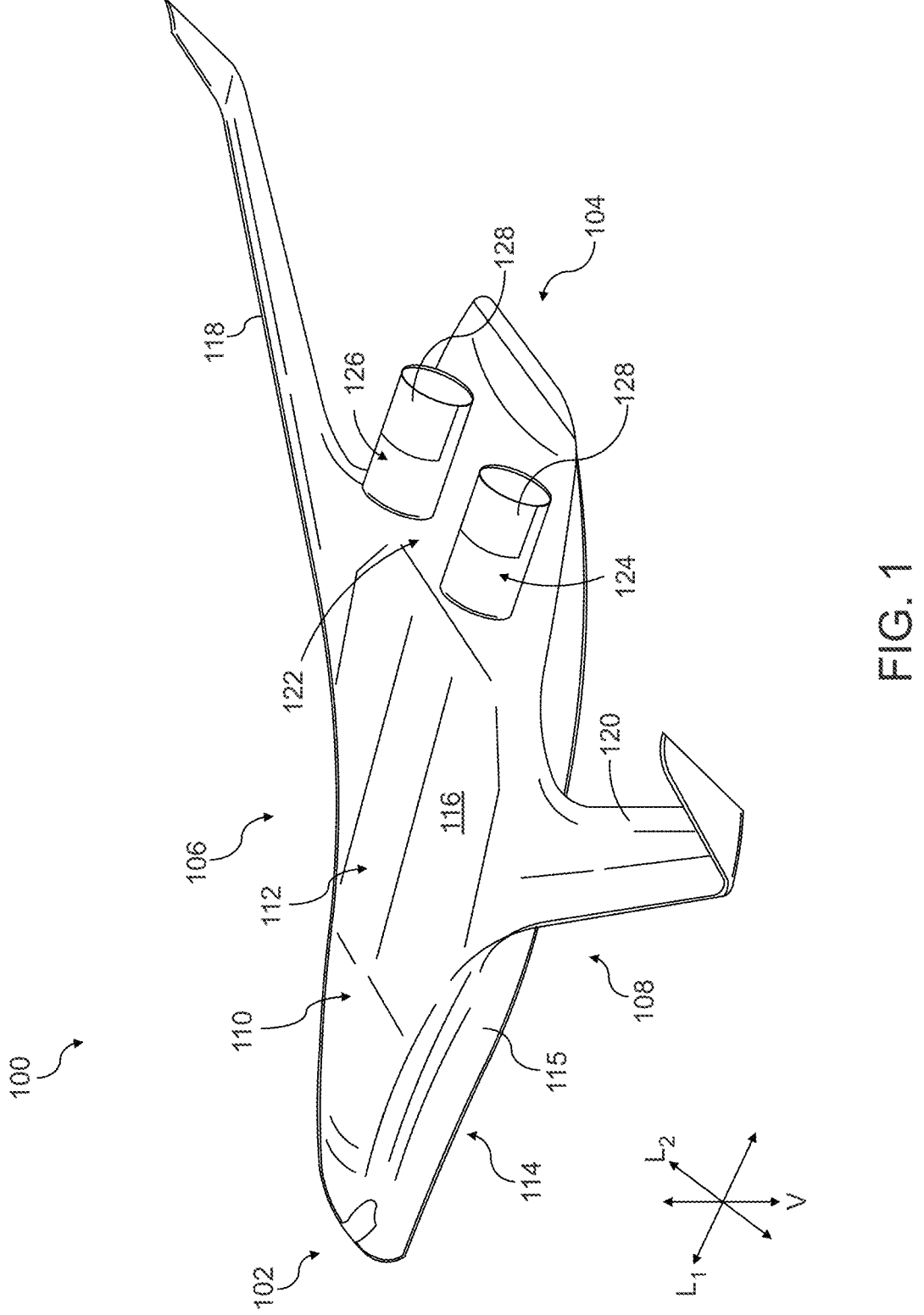
FIG. 1 is a perspective view of an aircraft in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "forward" and "aft" refer to relative positions within a gas turbine engine or vehicle, and are based on a normal operational attitude of the gas turbine engine or vehicle. More particularly, forward and aft are used herein are with reference to a direction of travel and a direction of propulsive thrust of the gas turbine engine or vehicle.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

As noted above, improvements to traditional aircraft design to allow for increased efficiency and cargo utilization would be welcomed in the art. The inventors of the present disclosure found that utilization of a blended wing aircraft design can provide such an improvement. In particular, with the blended wing aircraft design, a body of the aircraft can contribute to lift, while also allowing for increased cargo space, improved aerodynamic efficiency, etc.

With the blended wing aircraft design, engines of the aircraft can be mounted on a top side of the body, allowing for the body to block at least a portion of the noise from the engines from impacting community locations, further allowing for the engines to ingest boundary layer airflow over the body to provide increased net thrust for the aircraft. However, with such a configuration, it may be difficult to provide thrust reverse for the aircraft.

The present disclosure provides for a blended wing aircraft having a body with a fuselage and a pair of wings extending outward from the fuselage. The blended wing aircraft further includes an aircraft engine defining an outlet and including a thrust reverser assembly, the thrust reverser assembly includes a deployable structure extending less than 360 degrees around the outlet. Aspects of the present disclosure provide for desired thrust reverse for the aircraft despite the mounting location of the aircraft engine against the body.

Referring now to the drawings, wherein identical numerals indicate the same elements throughout the figures, FIG. 1 provides a perspective view of an aircraft 100 as may incorporate various embodiments of the present disclosure. In particular, as will be discussed in greater detail, below, the aircraft 100 of FIG. 1 is configured as a blended wing aircraft.

The aircraft 100 defines a longitudinal direction L1 that extends therethrough, a lateral direction L2, a vertical direction V, a forward end 102 and an opposing aft end 16 along the longitudinal direction L1, a starboard side 106 and an opposing port side 108 along the lateral direction L2, and a top side 112 and an opposing bottom side 114 along the vertical direction V.

Further, it will be appreciated that the aircraft 100 includes a body 110 extending longitudinally from the forward end 102 of the aircraft 100 to the aft end 104 of the aircraft 100, the body 110 including a fuselage 115 and a pair of wings. In particular, the aircraft 100 includes a first wing 118 and a second wing 120. The first wing 118 extends outwardly from the fuselage 115 of the body 110 generally along the lateral direction L2 on the starboard side 106 and the second wing 120 similarly extends outwardly from the fuselage 115 of the body 110 generally along the lateral direction L2 on the port side 108. Although not depicted, it will be appreciated that each of the wings 118, 120 may include one or more leading edge flaps, one or more trailing edge flaps, or both.

The exemplary aircraft 100 of FIG. 1 also includes a propulsion system 122. The exemplary propulsion system 122 depicted includes a plurality of engines, and more specifically includes a first engine 124 and a second engine 126. In the embodiment depicted, the first engine 124 and the second engine 126 are spaced from one another along the lateral direction L2, and are mounted to the body 110 of the aircraft 100 at the aft end 104 of the aircraft 100. It will be appreciated, that as used herein, the term "at the aft end 104" refers to a location along the longitudinal direction L1 closer to the aft end 104 of the aircraft 100 than the forward end 102 of the aircraft 100. Briefly, it will further be appreciated that for the embodiment depicted, the first engine 124 and second engine 126 are mounted to the body 110 of the aircraft 100 on the top side 112 of the aircraft 100 and each includes a thrust reverser assembly 128.

It will be appreciated, however, that in other exemplary embodiments, the first engine 124 and second engine 126 may be mounted to the body 110, e.g., on a bottom side 114 or at a trailing edge (not labeled). Further, although the first engine 124 and second engine 126 are coupled to the body 110 in the embodiment shown, in other embodiments, they may be formed integrally with the body 110.

As noted above, the aircraft 100 is configured as a blended wing aircraft. In such a manner, it will be appreciated that the body 110 of the aircraft 100 is generally shaped like an airfoil, such that the body 110 of the aircraft 100 generates upward lift (along the vertical direction V) during steady altitude flight operations. For example, during a cruise operating condition of the aircraft 100, the body 110 may contribute between 10% and 95% of the upward lift for the aircraft 100, such as between 25% and 90% of the upward lift for the aircraft 100, with the remainder being provided by the first and second wings 118, 120. In addition, the first and second wings 118, 120 are aerodynamically contoured to have a smooth transition with the body 110 of the aircraft 100, which can reduce an overall drag on the aircraft 100.

Figure 2:
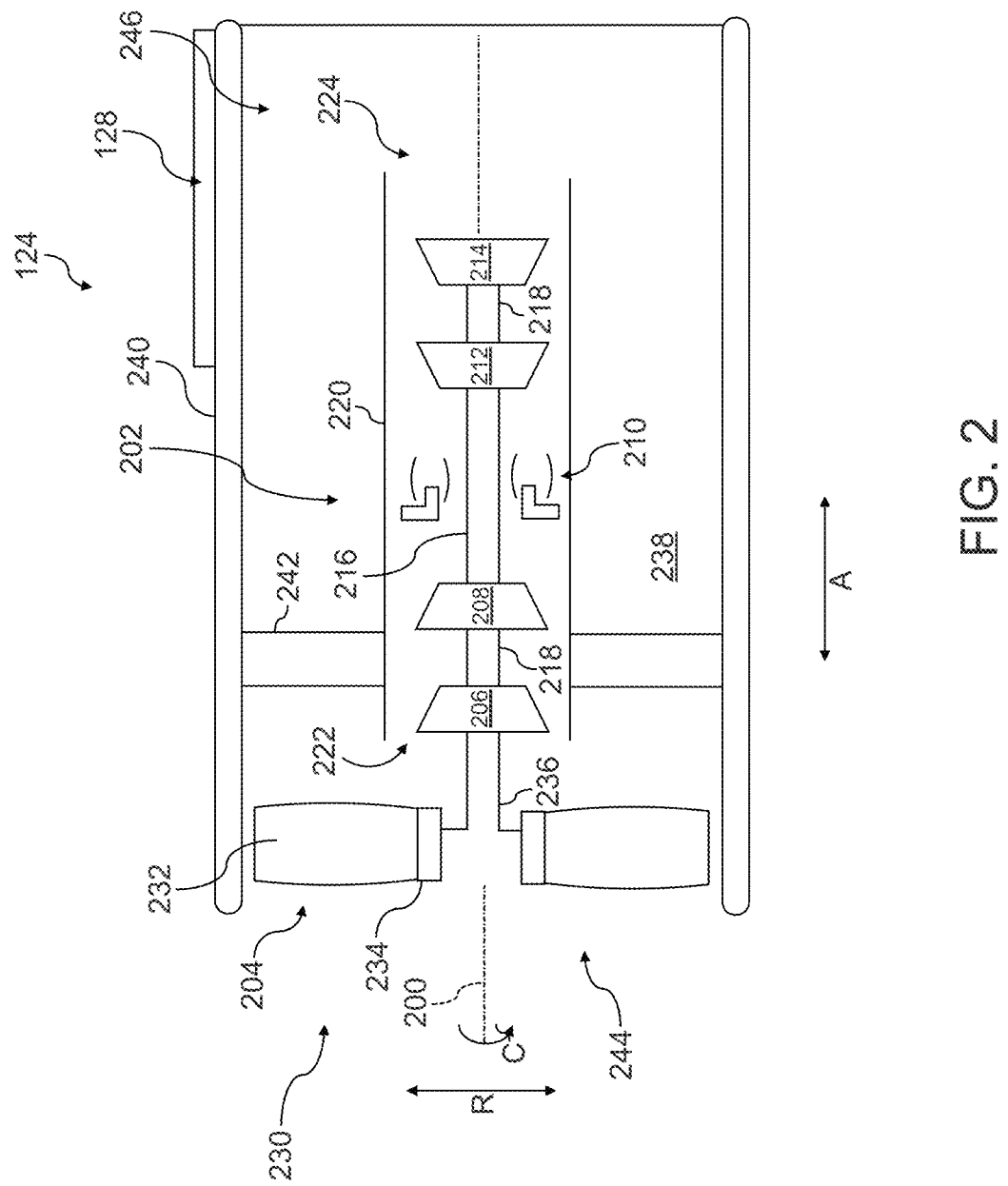
FIG. 2 is a side, schematic view of a first aircraft engine of the aircraft of FIG. 1 in accordance with an exemplary aspect of the present disclosure.

Referring now to FIG. 2, a schematic cross-sectional view of the first engine 124 of the propulsion system 122 of an aircraft 100 of FIG. 1 is presented.

It will be appreciated that although the first engine 124 is depicted and discussed, the second engine 126 may be configured in a similar manner as one or more of these embodiments.

The first engine 124 is configured as a gas turbine engine. For example, the first engine 124 includes a turbomachine 202 and a fan assembly 204, and defines an axial direction A, a radial direction R, and a circumferential direction C. The fan assembly 204 includes a fan 230 positioned proximate a forward end of the first engine 124.

The turbomachine 202 of the gas turbine engine defines a turbomachine inlet 222 and a turbomachine exhaust 224, and includes a compressor section, a combustion section 210, and a turbine section. The compressor section includes a low-pressure compressor 206 and a high-pressure compressor 208. The combustion section 210 receives compressed air from the compressor section and mixes it with fuel for combustion, generating high-energy exhaust gases. These exhaust gases then flow into the turbine section, which includes a high-pressure turbine 212 and a low-pressure turbine 214. The high-energy exhaust gases expand through the turbine section, causing the turbines to rotate and produce mechanical work. In particular, it will be appreciated that for the embodiment shown, the turbomachine 202 further includes a high pressure shaft 216 extending between and mechanically coupling the high-pressure compressor 208 and high pressure turbine 212, and a low pressure shaft 218 extending between and mechanically coupling the low pressure compressor 206 and low pressure turbine 214.

As noted, the fan assembly 204 includes the fan 230 and defines a fan inlet 244. The fan 230 in turn includes a plurality of fan blades 232 and a fan disk 234, with the plurality of fan blades 232 coupled to the fan disk 234. The fan assembly 204 further includes a fan shaft 236 mechanically coupling the turbomachine 202 with the fan 230 (via, e.g., one or more of the low pressure compressor 206 or low pressure shaft 218).

The gas turbine engine 124 further includes an outer nacelle 240 that encloses the fan 230 and defines in part the fan inlet 244, and further defines an engine exhaust 246 for the embodiment shown. The outer nacelle 240 surrounds the fan 230 and is coupled to the turbomachine 202 through a plurality of inlet guide vanes 242 located upstream of the fan blades 232 of the fan 230. In such a manner, it will be appreciated that the gas turbine engine of FIG. 2 is more specifically configured as a turbofan engine.

Moreover, the outer nacelle 240 surrounds the turbomachine 202 and defines a bypass passage 238 with an outer casing 220 of the turbomachine 202.

Moreover, it will be appreciated that for the exemplary embodiment depicted, the first engine 124 further includes a thrust reverser assembly 128. In the embodiment shown, the thrust reverser assembly 128 is coupled to, or otherwise integrated with, the outer nacelle 240 of the first engine 124.

Figure 3A:
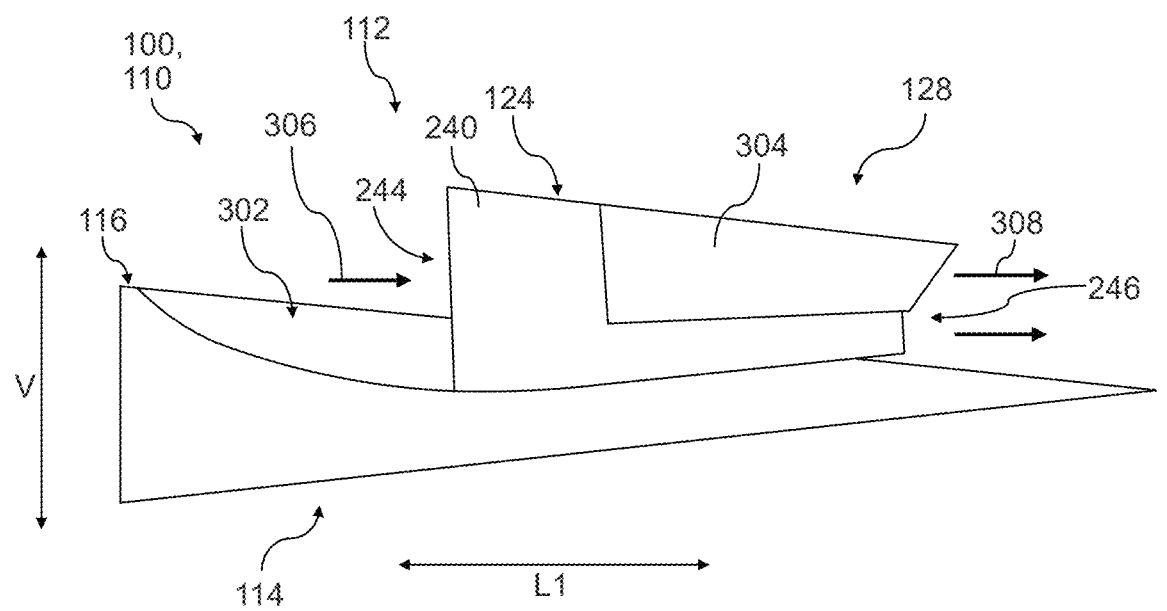
FIG. 3A is a side, schematic view of a first aircraft engine having a thrust reverser assembly in accordance with an exemplary aspect of the present disclosure, with the thrust reverser assembly in a stowed position.
Figure 3B:
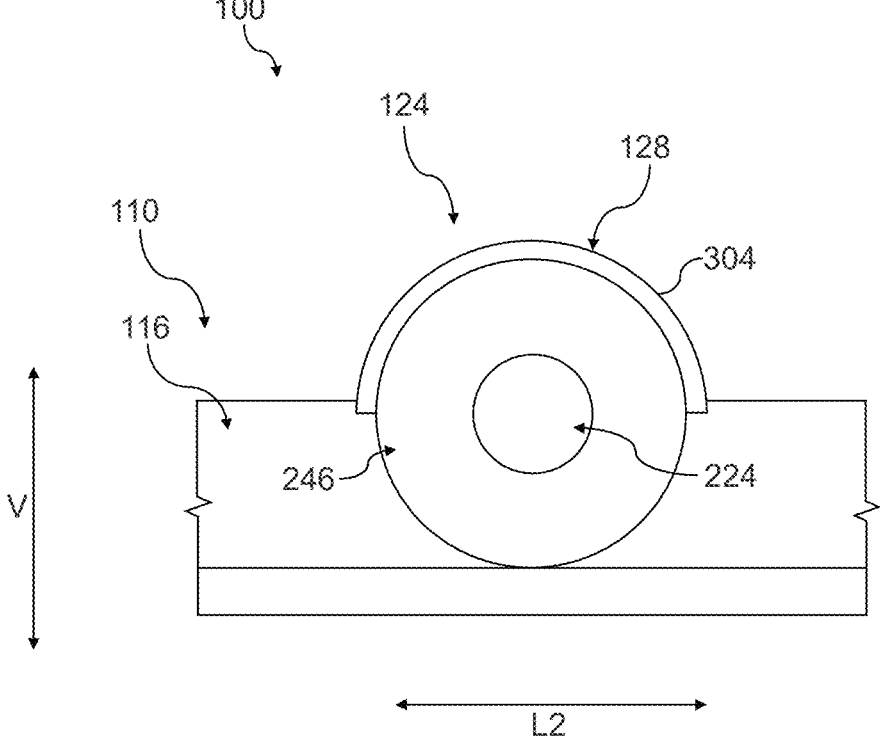
FIG. 3B is an axial view of the exemplary first aircraft engine of FIG. 3A with the thrust reverser assembly in the stowed position.

Referring now to FIGS. 3A and 3B, which illustrates an exemplary embodiment of a thrust reverser assembly 128 integrated with a first engine 124 of an aircraft 100, a configuration of the thrust reverser assembly 128 in the stowed state is depicted. FIG. 3A presents a side schematic view of the first engine 124, showing the thrust reverser assembly 128 in a stowed position, while FIG. 3B provides an axial view of the same, also in the stowed position.

In FIG. 3A, the first engine 124 (also referred to hereinbelow as "engine 124" for simplicity) is shown mounted on a top side 112 of a body 110 of the aircraft 100. The engine 124 includes an engine inlet 244, through which an inlet airflow 306 for the engine is received. The airflow 306 is guided through an inlet channel 302 defined by a flowpath surface 116 of the aircraft 100. This inlet channel 302 can direct a boundary layer airflow and/or freestream airflow smoothly into the engine inlet 244, e.g., providing the aerodynamic efficiency and performance of the engine 124.

The thrust reverser assembly 128 includes a deployable structure 304, which in the stowed position shown in FIG. 3A, does not obstruct an exhaust airflow 308 from an engine exhaust 246 of the engine 124, and moreover is integrated with an outer nacelle 240 of the engine 124. The integration of the deployable structure 304 with the outer nacelle of the engine 124 provides for a relatively seamless design approach that may reduce drag and mechanical complexity while providing a desired functionality of the thrust reverser assembly 128.

As will be appreciated, the outer nacelle 240 is positioned adjacent to the body 110 of the aircraft 100. As used herein, "adjacent to the body," as used in the context of the outer nacelle 240, refers to a least a portion of the outer nacelle 240 contacting the body 240, or otherwise being positioned such that at least a portion of a boundary layer airflow over the body 110 is ingested in the engine inlet 244 defined at least in part by the outer nacelle 240.

In particular, as is best seen in FIG. 3B, for the embodiment shown, the deployable structure 304 extends less than 360 degrees around the outlet of the engine 124, or rather around the engine exhaust 246. For example, in the embodiment depicted, the deployable structure 304 extends at least about 90 degrees and less than or equal to 270 degrees around the outlet of the engine 124, or rather around the engine exhaust 246. In the axial view of FIG. 3B, the thrust reverser assembly 128 is seen partially encircling the engine 124. The deployable structure 304 moreover is depicted in a configuration that complements a generally circular contour of the engine 124, aligning with the aerodynamic profile of the aircraft 100. In particular, it will be appreciated that for the embodiment shown, the deployable structure 304 is configured as a single clamshell door, and the thrust reverser assembly 128 is configured as a half clamshell thrust reverser assembly.

Notably, as used herein, the term "generally circular" refers to a circular design, as well as other shapes suitable for an outer nacelle, such as an ovoid, egg shapes, or other elongated-rounded shape.

Figure 4A:
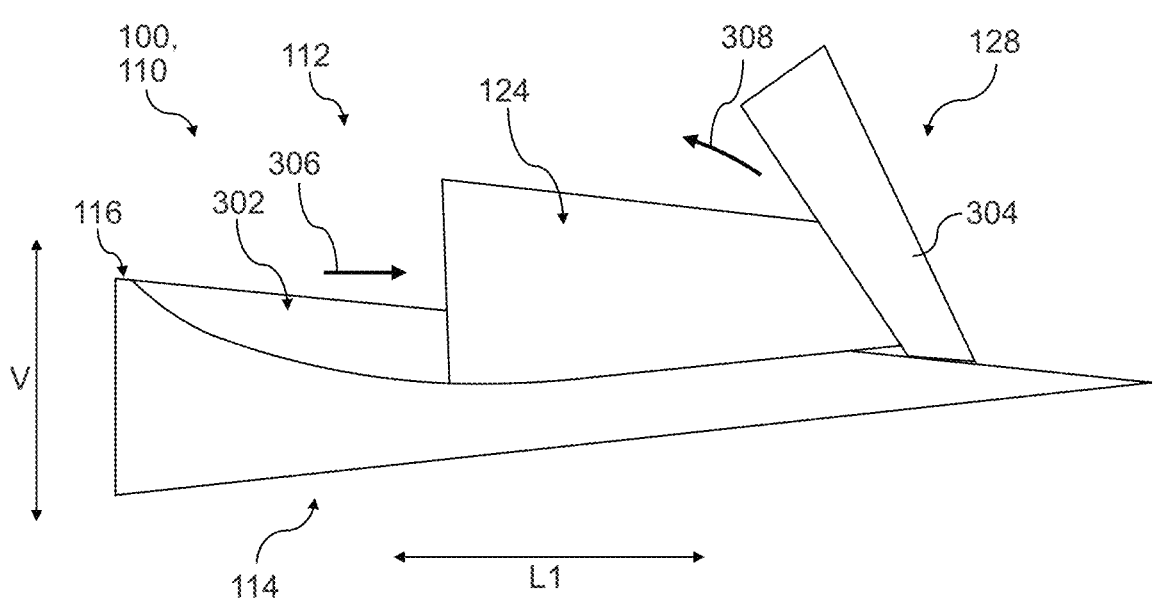
FIG. 4A is a side, schematic view of the exemplary first aircraft engine of FIG. 3 having the thrust reverser assembly in a deployed position.
Figure 4B:
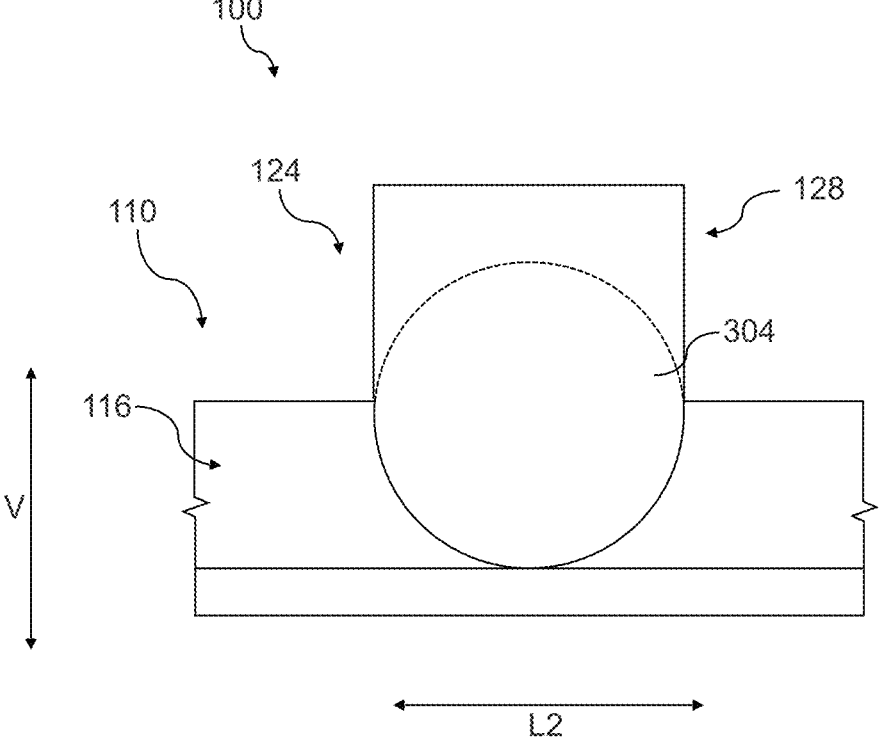
FIG. 4B is an axial view of the exemplary first aircraft engine of FIG. 3 with the thrust reverser assembly in the deployed position.

Referring now to FIG. 4, and, more specifically, to subfigures, FIGS. 4A and 4B, the thrust reverser assembly 128 of the first engine 124 of the aircraft 100 of FIG. 3 is illustrated in a deployed position. FIGS. 4A and 4B provide a detailed view of the operation and configuration of the thrust reverser assembly 128 when deployed to redirect the exhaust airflow 308 for reverse thrust in accordance with the exemplary aspects of the present disclosure.

FIG. 4A is a side schematic view of the first engine 124 mounted to the top side 112 of the body 110 of the aircraft 100. In this view, the inlet airflow 306 is similarly directed into the engine inlet 244 through the inlet channel 302 defined by the flowpath surface 116 of the aircraft 100. However, the deployable structure 304 of the thrust reverser assembly 128 is shown in its deployed position, blocking and redirecting the exhaust airflow 308 from the engine exhaust 246 to generate a reverse thrust for the engine 124 and aircraft incorporating the engine 124.

In the deployed position as shown in FIGS. 4A and 4B, the deployable structure 304 contacts the flowpath surface 116 downstream of the engine exhaust 246. This arrangement enables redirecting the exhaust airflow 308 effectively, providing at least in part the reverse thrust capability of the aircraft 100 during landing or other reverse thrust maneuvers. The deployable structure 304, configured as a clamshell door, contacts the flowpath surface downstream of the outlet when in the reverse thrust position.

FIG. 4B provides an axial view of the first engine 124, further detailing the interaction between the deployable structure 304 and the surrounding components, with an upper portion of the engine exhaust 246 outlined in phantom. In this depiction, the thrust reverser assembly 128 is shown in a fully deployed state around the circumference of the engine exhaust 246. The deployable structure 304 more specifically forms a seal with the flowpath surface 116 downstream of the turbomachine exhaust 224, enabling the redirected exhaust airflow 308 to provide increased reverse thrust without escape of exhaust gases between the deployable structure 304 and flowpath surface 116 that could reduce the effectiveness of the thrust reversal.

Although not depicted, the thrust reverser assembly 128 of FIGS. 3 and 4 may further include one or more actuators operable with the deployable structure 304 to move the deployable structure from the stowed position in FIG. 3 to the deployed position in FIG. 4. The one or more actuators may be embedded within the outer nacelle and may be in operable communication with a controller of the engine 124 and/or the aircraft incorporating the engine 123.

In such a manner, the thrust reverser assembly 128 of FIGS. 3 and 4 incorporates a deployable structure 304 capable of transitioning smoothly between stowed and deployed positions, interacting with the flowpath surface

116 of the aircraft when in the deployed position (FIG. 4), allowing the thrust reverser assembly 128 to operate effectively with the blended wing aircraft design. In sum, FIGS. 3 and 4 illustrate the advanced functionality and role of the thrust reverser assembly 128 in the operation of the blended wing aircraft 100. The deployable structure 304, when deployed, interacts seamlessly with the flowpath surface 116 to redirect exhaust airflow 308 effectively, supporting enhanced braking and reverse thrust capabilities that may allow for efficient aircraft operations.

Figure 5:
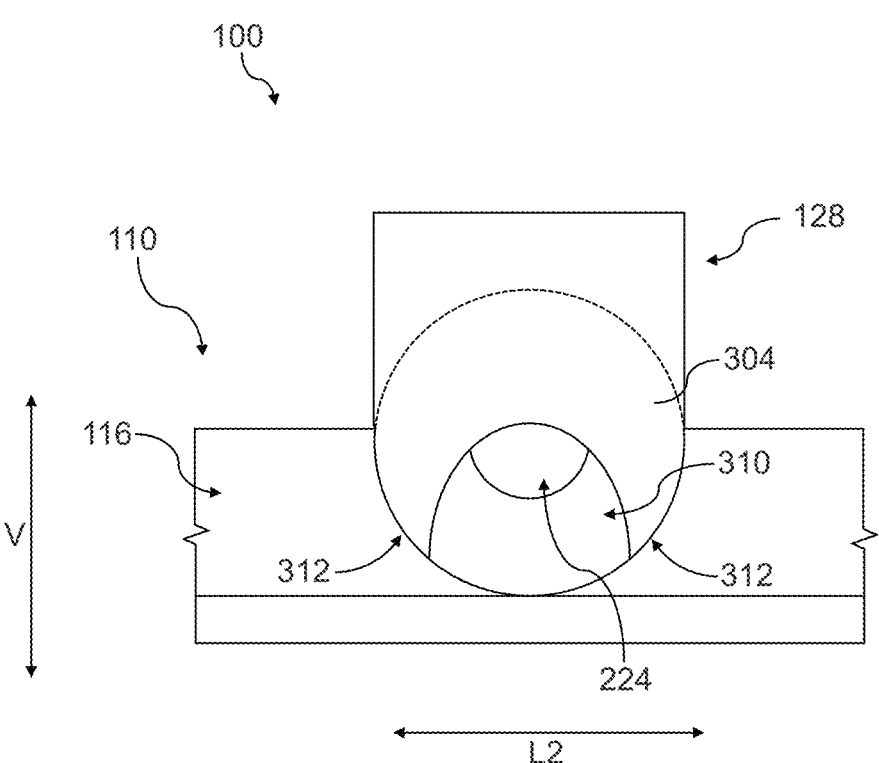
FIG. 5 is an axial view of a first aircraft engine with a thrust reverser assembly in accordance with another exemplary aspect of the present disclosure, with the thrust reverser assembly in the deployed position.

Referring now to FIG. 5, an axial view of a first aircraft engine 124 with a thrust reverser assembly 128 in accordance with another exemplary aspect of the present disclosure is illustrated, with the thrust reverser assembly 128 in the deployed position. This figure provides a detailed representation of the thrust reverser assembly 128 functioning in conjunction with an aircraft 100, particularly showing the interaction between the deployable structure 304 and the turbomachine exhaust 224. The thrust reverser assembly 128 of FIG. 5 may be configured in a similar manner as the exemplary thrust reverser assembly 128 of FIGS. 3 and 4.

For example, the thrust reverser assembly 128 is depicted as being positioned on a body 110 of the aircraft 100, specifically interacting with the flowpath surface 116 of the aircraft 100. In this exemplary embodiment, a deployable structure 304 of the thrust reverser assembly 128 is shown in a deployed position, where it is configured to manage an exhaust airflow from the engine exhaust 246 and from the turbomachine exhaust 224 (see, also, FIG. 2).

However, the deployable structure 304 in FIG. 5 demonstrates a unique scalloped design as compared to the deployable structure 304 described above. In particular, the deployable structure 304 defines a cutout 310 downstream of the exhaust when in the reverse thrust position. The cutout 310 is an opening in the deployable structure 304 that can allow for the passage of hotter exhaust gases from the turbomachine exhaust 224 therethrough and for the redirection of cooler flow from the bypass passage 238 (see FIG. 2) to be redirected. By enabling a portion of the exhaust gases to escape directly through this cutout 310, the remainder of the deployable structure 304 can be constructed from materials that are potentially less capable of withstanding high temperatures, reducing cost and/or weight. This configuration provides a practical solution to managing the intense heat and pressure of the exhaust gases while maintaining the structural integrity and functionality of the thrust reverser assembly 128.

Moreover, the scalloped design of the deployable structure 304 ensures that the outer portions (e.g., sides 312) of the structure still form an effective seal with the flowpath surface 116 of the aircraft 100. This sealing interaction allows for effective redirection of the remaining exhaust airflow from the bypass passage 238 (see FIG. 2), which enhances the reverse thrust capabilities of the engine 124 and aircraft 100.

In sum, FIG. 5 provides a clear and detailed illustration of a deployed thrust reverser assembly 128, highlighting a scalloped design of the deployable structure 304 that allows for effective thermal management and material choice. This design not only supports the operational demands of the aircraft 100 but also aligns with the broader objectives of the present disclosure to enhance aircraft efficiency and performance.

Referring now to FIG. 6, which illustrates a thrust reverser assembly 128 in a first aircraft engine 124 of a blended wing aircraft 100, another embodiment of the present disclosure is depicted across three subfigures, FIGS.

6A, 6B, and 6C. These figures demonstrate the thrust reverser assembly 128, showcasing the transition from a stowed position to a deployed position that enables reverse thrust operation.

Figure 6A:
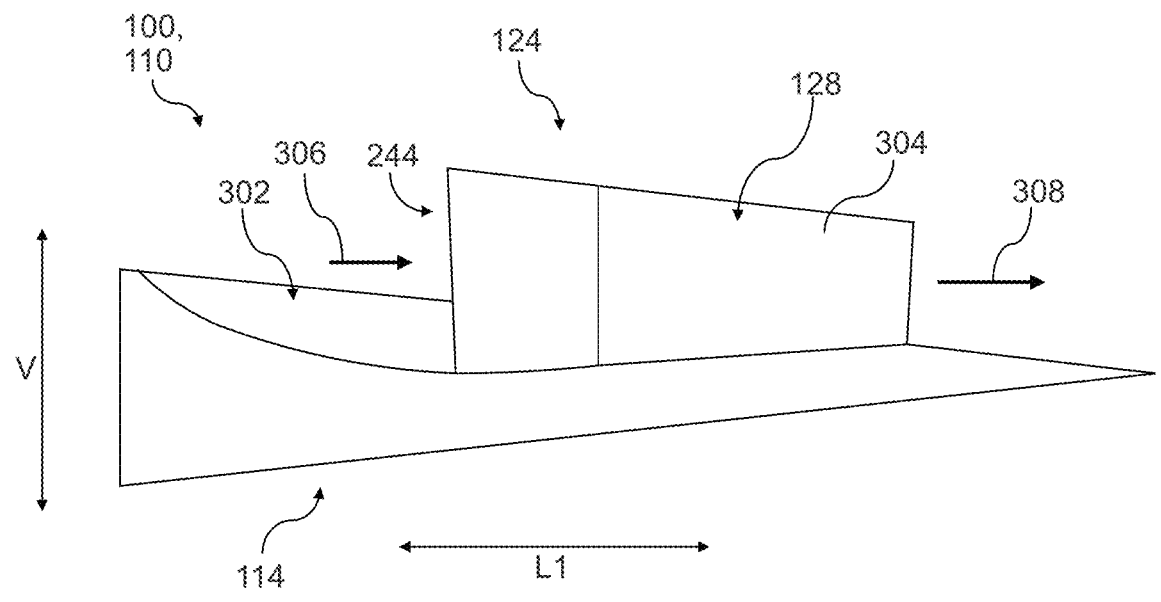
FIG. 6A is a side, schematic view of a first aircraft engine having a thrust reverser assembly in accordance with an exemplary aspect of the present disclosure, with the thrust reverser assembly in a stowed position.

FIG. 6A presents a side, schematic view of the first aircraft engine 124, which is part of the propulsion system of the aircraft 100. The engine 124 includes the thrust reverser assembly 128 with a deployable structure 304 in a stowed position. The aircraft engine 124 draws in inlet airflow 306 through an engine inlet 244, which is guided by an inlet channel 302 formed in the flowpath surface 116 of the aircraft 100. In this stowed position, the deployable structure 304 of the thrust reverser assembly 128 does not obstruct the path of an exhaust airflow 308, which exits the engine through the engine exhaust 246 (see FIG. 2).

Figure 6B:
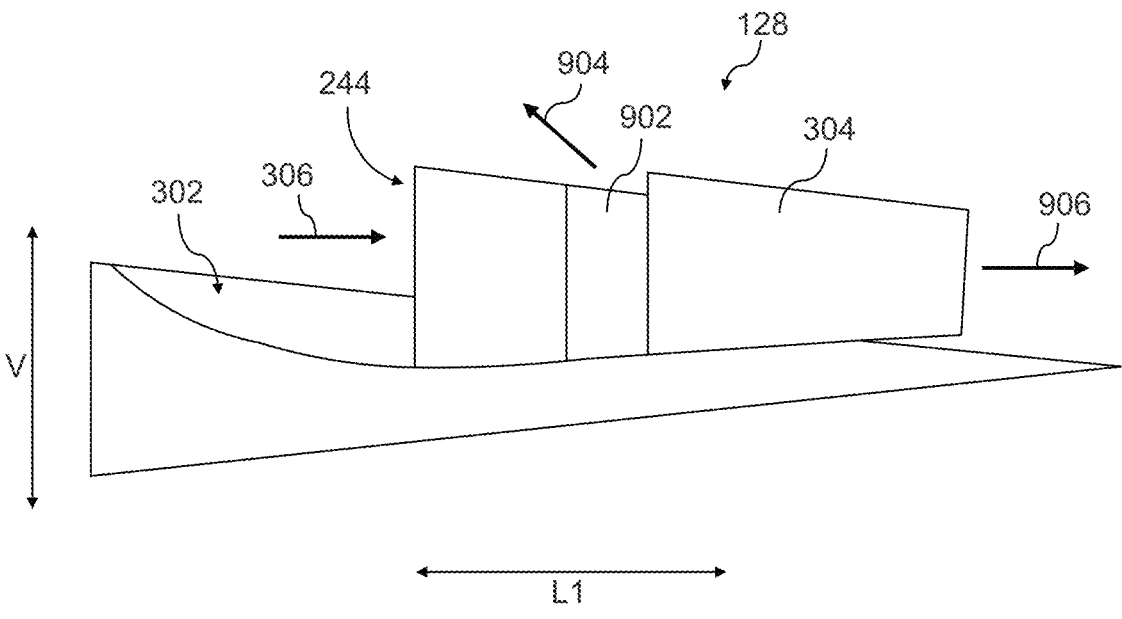
FIG. 6B is a side, schematic view of the exemplary first aircraft engine of FIG. 6A having the thrust reverser assembly in a deployed position.

Referring now to FIG. 6B, a side schematic view is provided illustrating the first aircraft engine 124 with the thrust reverser assembly 128 of FIG. 6A in a deployed position. Here, the deployable structure 304 has translated at least partially along an axial direction of the engine 124 (aligned with the longitudinal direction L1 in the embodiment shown) to expose a cascade assembly 902 of the thrust reverser assembly 128. This movement allows the exhaust airflow 308 to be redirected through the cascade assembly 902, creating a reverse thrust airflow 904, as will be described in more detail below. This reverse thrust can provide braking and maneuvering thrust for the aircraft 100 during landing or in other reverse thrust scenarios.

As will be appreciated from the views of FIGS. 6A and 6B, in the embodiment shown, the deployable structure 304 and cascade assembly 902 exposed by the deployable structure 304 each extend less than 360 degrees around the outlet of the engine 124. For example, in the embodiment depicted, the deployable structure 304 and cascade assembly 902 each extend at least about 90 degrees and less than or equal to 270 degrees around the outlet of the engine 124, or rather around the engine exhaust 246.

Figure 6C:
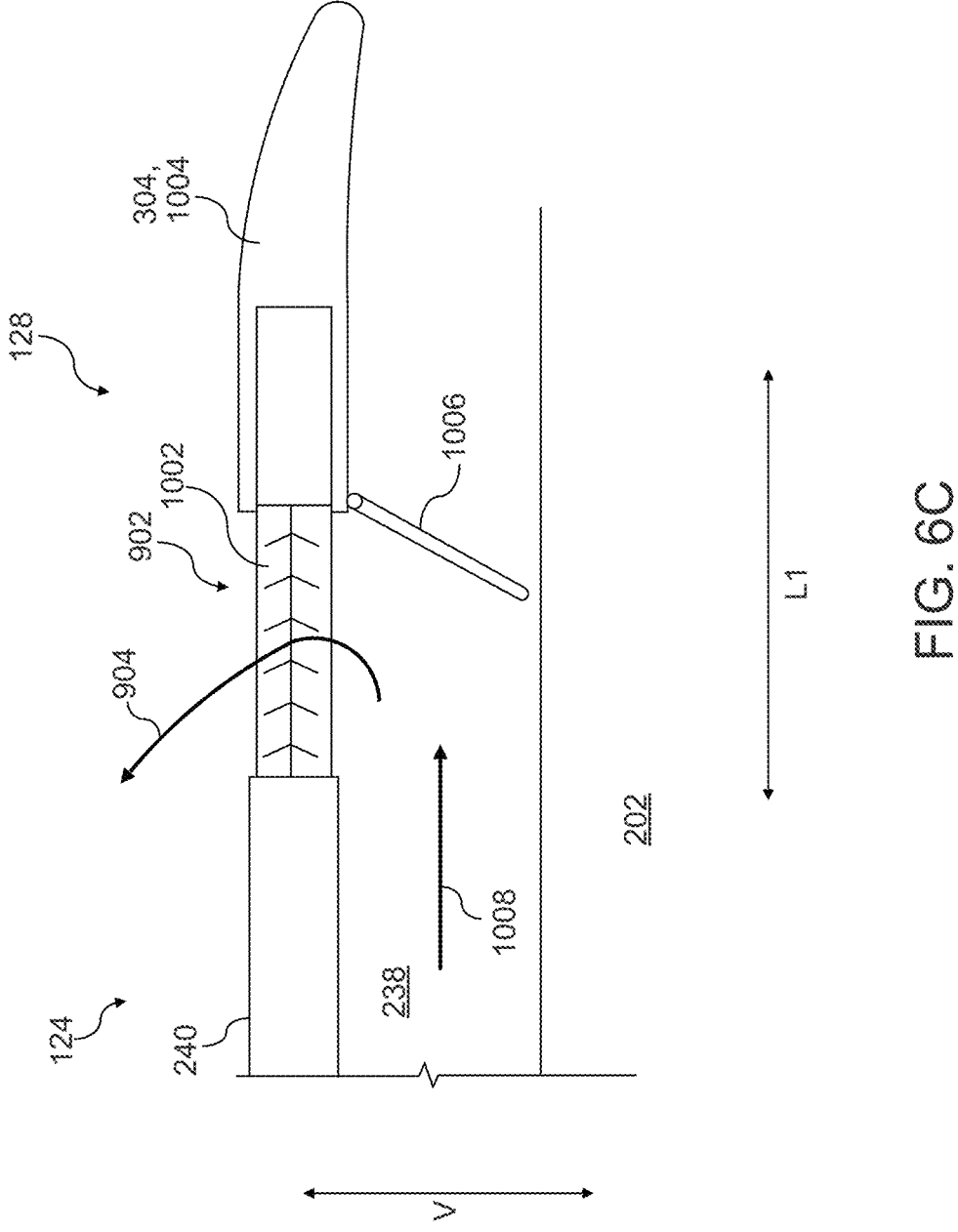
FIG. 6C is a close-up view of a cascade assembly in accordance with an exemplary aspect of the present disclosure of the thrust reverser assembly of FIGS. 6A and 6B.

Referring now to FIG. 6C, a detailed, close-up view is provided of the cascade assembly 902 within the thrust reverser assembly 128 of FIGS. 6A and 6B. This view highlights the design of the cascade assembly 902, which effectively redirects an exhaust airflow from the engine 124. The cascade assembly 902 includes a plurality of cascade sections 1002, each defining a channel that reorients the flow of exhaust gases to produce reverse thrust airflow 904. In particular, for the embodiment depicted the thrust reverser assembly 128 further includes one or more blocker doors 1006 movable into a bypass passage 238 of the engine 124 when the translating cowl is in the reverse thrust position, as shown in FIG. 6C. These blocker door(s) 1006 direct a bypass airflow 1008 through the bypass passage 238 into and through the cascade assembly 902, ensuring that the reverse thrust generated is both effective and efficient.

As will also be appreciated, in the embodiment depicted in FIGS. 6A-6C, the deployable structure 304 is configured as an aft section 1004 of the outer nacelle 240, which translates between a forward thrust position (see FIG. 6A) and a reverse thrust position (see FIGS. 6B, 6C). In such a manner, the deployable structure 304/aft section 1004 of the outer nacelle 240 is configured as a translating cowl incorporated into the outer nacelle. In the forward thrust position, the cascade assembly 902 is enclosed within the outer nacelle 240. In the reverse thrust position, the cascade assembly 902 is exposed, as shown.

In sum, FIG. 6 (collectively including FIGS. 6A-6C) illustrates the functionality of the thrust reverser assembly 128 in a blended wing aircraft. The deployable structure 304, acting as a translating cowl, and the cascade assembly 902 work in concert to provide reverse thrust capabilities despite only extending partially around the outlet of the engine, given the position of the engine 124 on the body 110 of the aircraft 100.

Figure 7:
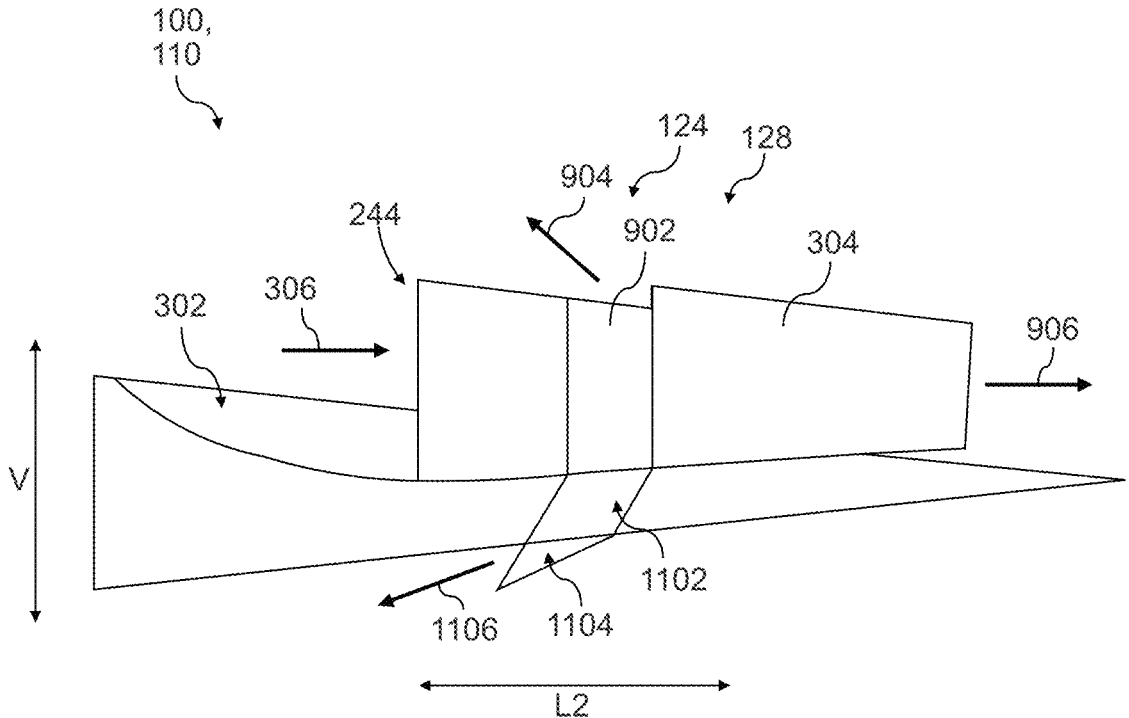
FIG. 7 is a side, schematic view of a first aircraft engine having the thrust reverser assembly in accordance with another exemplary aspect of the present disclosure in a deployed position.

Referring now to FIG. 7, a side, schematic view of a first aircraft engine 124 having a thrust reverser assembly 128 in accordance with another exemplary aspect of the present disclosure in a deployed position is illustrated. This figure exemplifies an embodiment configured in a similar manner as the exemplary embodiment of FIG. 6. However, for the embodiment of FIG. 7, a body 110 of the aircraft 100 further defines a reverse thrust passage 1102 to direct airflow through the body 110 and generate a reverse thrust, supporting enhanced operational flexibility.

In particular, the first engine 124 of the propulsion system is shown equipped with a thrust reverser assembly 128 that includes a deployable structure 304. This deployable structure 304 is shown in a deployed state, where the deployable structure 304 effectively redirects the exhaust airflow 308 from the engine exhaust 246. The engine 124 draws inlet airflow 306 through an engine inlet 244, which is guided by an inlet channel 302 formed in the flowpath surface 116 of the aircraft 100, in the embodiment shown.

The thrust reverser assembly 128 further incorporates a cascade assembly 902 configured to redirect bypass airflow 1008 through the bypass passage 238 (see FIG. 6C). The cascade assembly 902 includes multiple sections 1002 that reorient the flow of exhaust gases to produce reverse thrust airflow 904.

Additionally, as briefly noted above, the body 110 of the aircraft defines the thrust reverse passage 1102 that extends from the aircraft engine 124 towards the bottom side 114 of the aircraft, as indicated in claim 14. This reverse thrust passage 1102 is oriented in a forward direction, which facilitates the effective channeling of the reverse thrust airflow 904 from the cascade assembly 902 to the exterior of the aircraft 100, thereby augmenting the reverse thrust capabilities. Although not depicted, a separate door may be provided for this thrust reverse passage 1102 that is articulated to allow the airflow therethrough. For example, there may be a mechanical connection between the deployable structure 304 and the door that opens the thrust reverse passage 1102. The thrust reverse passage 1102 may more specifically include a plurality of doors, one that opens below the aircraft at deflector 1104 to allow reverse thrust airflow 1106, and a second door at a junction between the thrust reverse passage 1102 and the cascade assembly 902.

An airflow deflector 1104 is strategically positioned within or at a downstream end of the thrust reverse passage 1102 to further assist in directing a reverse thrust airflow 1106 through the thrust reverse passage 1102 in the forward direction. This deflector 1104 may allow for the airflow to be channeled effectively through the body 110 of the aircraft 100, increasing a utilization of the reverse thrust generated by the engine 124 and the thrust reverser assembly 128.

In sum, FIG. 7 provides an illustration of a deployed thrust reverser assembly 128 in a blended wing aircraft, showcasing an advanced design and functionality of the present disclosure. The integration of the deployable structure 304, cascade assembly 902, thrust reverse passage 1102, and airflow deflector 1104 may provide improved performance and safety for the aircraft 100.

Figure 8A:
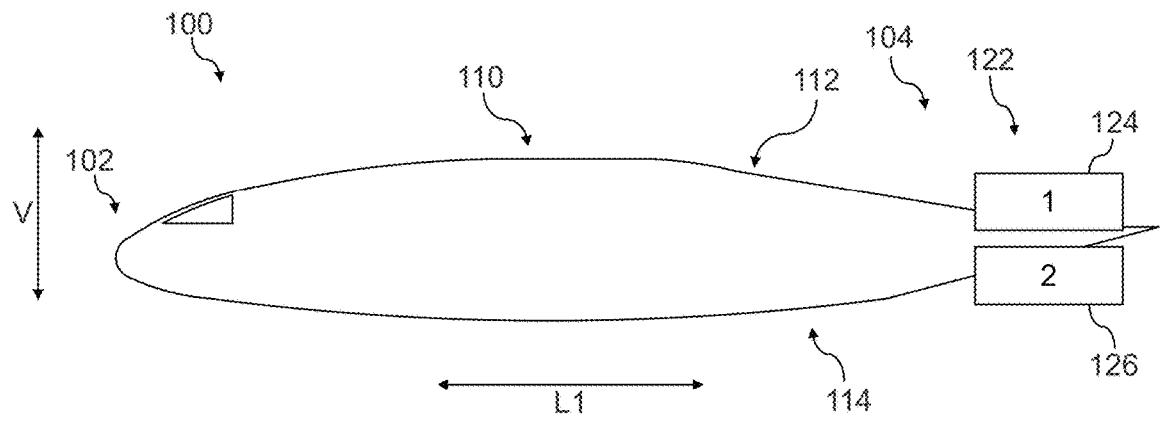
FIG. 8A is a side, schematic view of an aircraft in accordance with another exemplary aspect of the present disclosure.
Figure 8B:
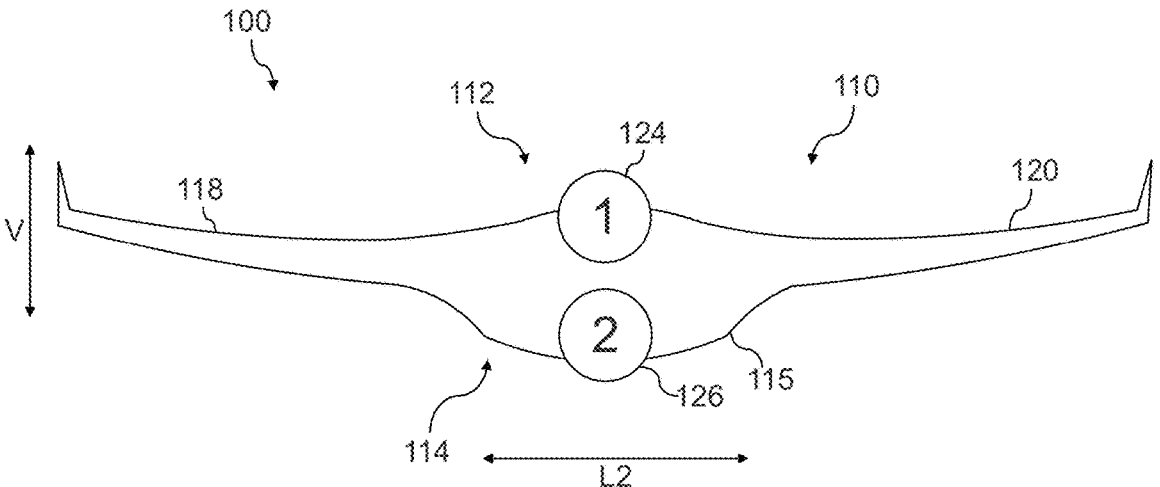
FIG. 8B is a forward-looking-aft, schematic view of the exemplary aircraft of FIG. 8A.

Referring now to FIG. 8, which is presented in two subfigures, FIGS. 8A and 8B, an exemplary embodiment of the present disclosure is depicted, showcasing an aircraft 100 with a propulsion system 122 in accordance with an exemplary aspect of the present disclosure. This configuration features a first aircraft engine 124 (labeled "1") and a second aircraft engine 126 (labeled "2") arranged in a stacked orientation along a vertical direction V of the aircraft 100.

FIG. 8A provides a side, schematic view of the aircraft 100, illustrating the longitudinal direction L1 and the vertical direction V. The first aircraft engine 124 and the second aircraft engine 126 are mounted to a body 110 of the aircraft 100 in a configuration where one engine is positioned above the other along the vertical direction V. This stacked arrangement may be advantageous for improving an aerodynamic profile of the aircraft 100 and enhancing its operational efficiency.

In this embodiment, the first aircraft engine 124 is positioned on a top side 112 of the body 110, while the second aircraft engine 126 is mounted below it, on a bottom side 114 of the body 110. This arrangement can facilitate a compact design and can also allow for effective management of an airflow over/around the body 110 of the aircraft 100, as each engine can ingest boundary layer airflow that flows over their respective mounting positions on the body 110.

Referring particularly to FIG. 8B, a forward-looking-aft, schematic view is provided, further depicting the orientation and positioning of the first and second aircraft engines 124, 126 of FIG. 8A along the vertical direction V. This view emphasizes the alignment and the relative positioning of the engines 124, 126. In this embodiment, the first and second aircraft engines 124, 126 are aligned with a longitudinal centerline of the aircraft 100 (located at a center of the aircraft 100 in the lateral direction L2).

The aircraft 100, as depicted in FIGS. 8A and 8B, effectively utilizes a fuselage 115 of the body 110 to support the unique engine arrangement. This configuration can allow for the engines 124, 126 to ingest the boundary layer airflow, as mentioned above, on both the top side 112 and the bottom side 114 of the body 110. As will be appreciated, the boundary layer airflow may flow slower and be more turbulent and can, therefore, reduce a net propulsive thrust of the aircraft 100. By ingesting and reenergizing the boundary layer airflow with the engines 124, 126 the net propulsive thrust of the aircraft 100 may be increased, and a net fuel consumption may be reduced.

By arranging the first and second aircraft engines 124, 126 in a stacked configuration along the vertical direction V, the aircraft 100 may benefit from improved aerodynamic properties and operational efficiencies. This configuration not only supports the aerodynamic performance but also contributes to a more compact design.

Figure 9:
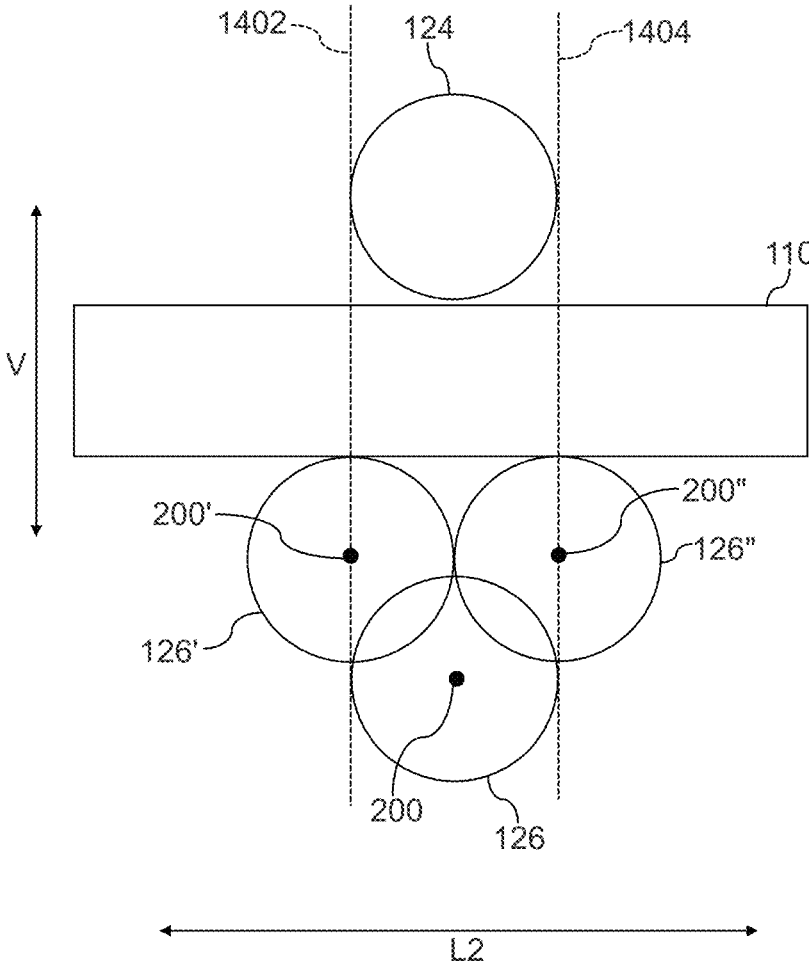
FIG. 9 is a forward-looking-aft, schematic view of a first aircraft engine and a second aircraft engine arranged in a stacked orientation along a vertical direction.

Referring now to FIG. 9, a forward-looking-aft, schematic view is provided of a first aircraft engine 124 and a second aircraft engine 126 arranged in a stacked orientation along a vertical direction V of an aircraft 100. This figure provides a visualization of what is meant by the term "stacked orientation along a vertical direction."

In FIG. 9, the aircraft 100 is shown with its body 110 extending along a lateral direction L2. The first aircraft engine 124 and the second aircraft engine 126 are mounted to the body 110 of the aircraft 100, with the first engine 124 positioned above the second engine 126 along the vertical direction V. This vertical stacking of the engines optimizes the use of space and may contribute to the aerodynamic efficiency of the aircraft 100 by minimizing or otherwise reducing the frontal area exposed to airflow, thereby reducing aerodynamic drag.

The first aircraft engine 124 is depicted at a higher vertical position relative to the second aircraft engine 126, as indicated by the vertical direction V. Additionally, FIG. 9 includes reference lines 1402 and 1404, which extend in the vertical direction at a first lateral side and a second lateral side of the first engine 124, respectively. These reference lines 1402 and 1404 help in visually aligning and positioning the engines 124 and 126 relative to each other and to the body 110 of the aircraft 100.

The figure also illustrates alternative positions 126' and 126" for the second engine 126, with corresponding centerlines 200' and 200", respectively. The extent of the term "stacked orientation along a vertical direction" refers to a centerline 200 of the second engine 126 being located laterally within the reference lines 1402 and 1404. As will be appreciated, the centerline 200 of the second engine is located laterally within the reference lines 1402 and 1404, and the centerlines 200' and 200" of the alternatively positioned second engines 126' and 126" are also located laterally within the reference lines 1402 and 1404.

The ability to adjust the position of the second engine 126 vertically provides opportunities to design for particular engine performance, maintenance accessibility, and aircraft balance, while still achieving the benefits noted above.

Figure 10:
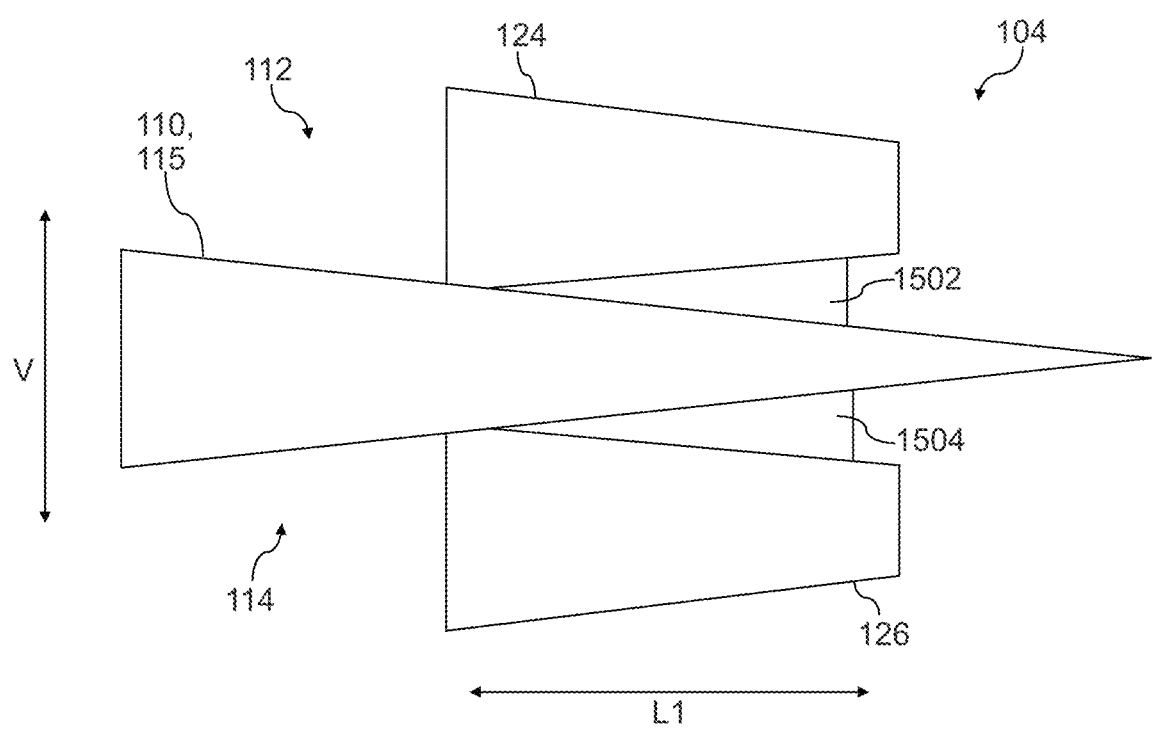
FIG. 10 is a schematic, close-up view of the first aircraft engine and the second aircraft engine of the exemplary aircraft of FIG. 9 mounted to a body of the aircraft at an aft end of the aircraft.

Referring now to FIG. 10, a schematic, close-up view of the first aircraft engine 124 and the second aircraft engine 126 of the exemplary aircraft 100 of FIG. 9 mounted to the body 110 of the aircraft 100 at the aft end 104 of the aircraft 100 is illustrated.

In this configuration, the first aircraft engine 124 and the second aircraft engine 126 are mounted in a stacked arrangement along the vertical direction V of the aircraft 100. This vertical stacking is advantageous for several reasons, including the reduction of the aircraft's lateral profile and the optimization of airflow dynamics over the body 110. The engines 124, 126 are positioned to align with the longitudinal direction L1 of the aircraft 100, which is indicative of their strategic placement to maintain balance and enhance the aerodynamic properties of the aircraft 100.

The mounting of the engines 124, 126 utilizes an upper engine mount 1502 and a lower engine mount 1504. These mounts 1502, 1504 provide a structure for securing the engines 124, 126 to the body 110 of the aircraft 100. The mounts 1502, 1504 may absorb vibrations and shocks that occur during operation. The upper engine mount 1502 supports the first engine 124, holding it in place above the second engine 126, which is supported by the lower engine mount 1504. This arrangement may provide for a desired level of structural integrity for the aircraft 100.

Figure 11:
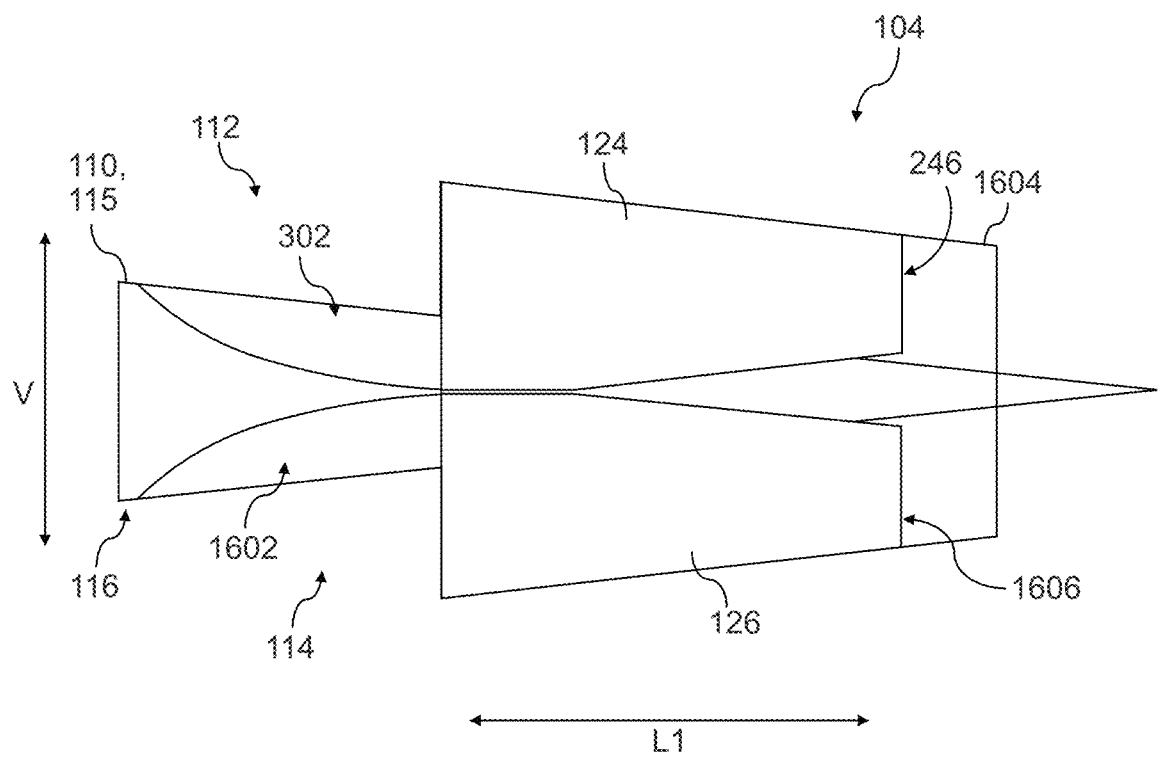
FIG. 11 is a schematic view of a first aircraft engine and a second aircraft engine of an aircraft in accordance with another exemplary embodiment of the present disclosure, mounted to a body of the aircraft at an aft end of the aircraft.

Referring now to FIG. 11, a schematic view of a first aircraft engine 124 and a second aircraft engine 126 of an aircraft in accordance with another exemplary embodiment of the present disclosure, mounted to a body 110 of the aircraft at an aft end 104 of the aircraft is depicted. The embodiment of FIG. 11 may be configured in a similar manner as the exemplary embodiment of FIGS. 8 through 10. However, for the embodiment of FIG. 11, both the first aircraft engine 124 and the second aircraft engine 126 are integrated into a common outer nacelle 1604.

For example, the body 110 of the aircraft, which includes the fuselage 115, extends longitudinally from a forward end (not shown) to the aft end 104 along a longitudinal direction L1. The body 110 also defines a top side 112 and a bottom side 114 along the vertical direction V of the aircraft. In this embodiment, the engines 124, 126 are mounted at the aft end 104 of the aircraft.

However, in the embodiment of FIG. 11, the first engine 124 and the second engine 126 are enclosed within the common outer nacelle 1604, which may provide several advantages including reduced aerodynamic drag. In particular, this configuration also allows for a more streamlined design, reducing an overall footprint of the engines 124, 126 on the aerodynamics of the aircraft.

Notably, as with certain embodiments above, the aircraft 100 incorporates distinct inlet channels 302, 1602 for each engine 124, 126, respectively, which may enhance an efficiency of air intake during operation.

The exhaust from the first and second aircraft engines 124, 126 are directed through respective engine exhausts 246, 1606. For the embodiment shown in FIG. 11, the common outer nacelle 1604 extends past the engine exhausts 246, 1606 in the longitudinal direction L1. In such a manner, the common outer nacelle 1604 may direct the exhaust airflow from both the engine exhausts 246, 1606 of the first and second aircraft engines 124, 126.

Figure 12:
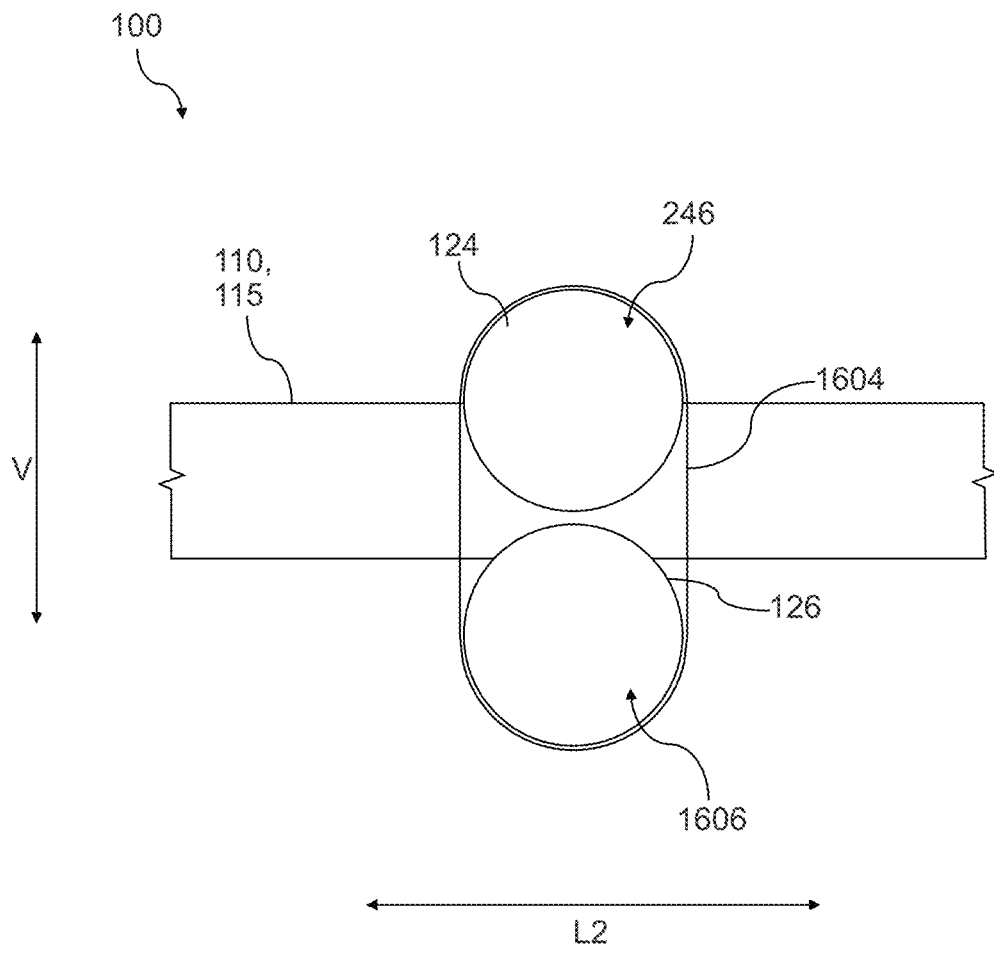
FIG. 12 is a schematic, axial view of a common nacelle for the first and second aircraft engines of the exemplary aircraft of FIG. 11.

Referring briefly now to FIG. 12, a schematic, axial view of the common nacelle for the first and second aircraft engines 124, 126 of the exemplary aircraft of FIG. 11 is presented. This view provides an aft-looking-forward perspective that illustrates how the common outer nacelle 1604 encloses both the first engine 124 and a second engine 126 of the aircraft 100.

The common outer nacelle 1604 not only provides a protective enclosure for the engines 124, 126 but also serves as a unifying structure that enhances the overall functional design of the aircraft. Moreover, the arrangement of the engines 124, 126 within the common outer nacelle 1604 allows for a reduction in the aircraft's lateral profile.

Figure 13A:
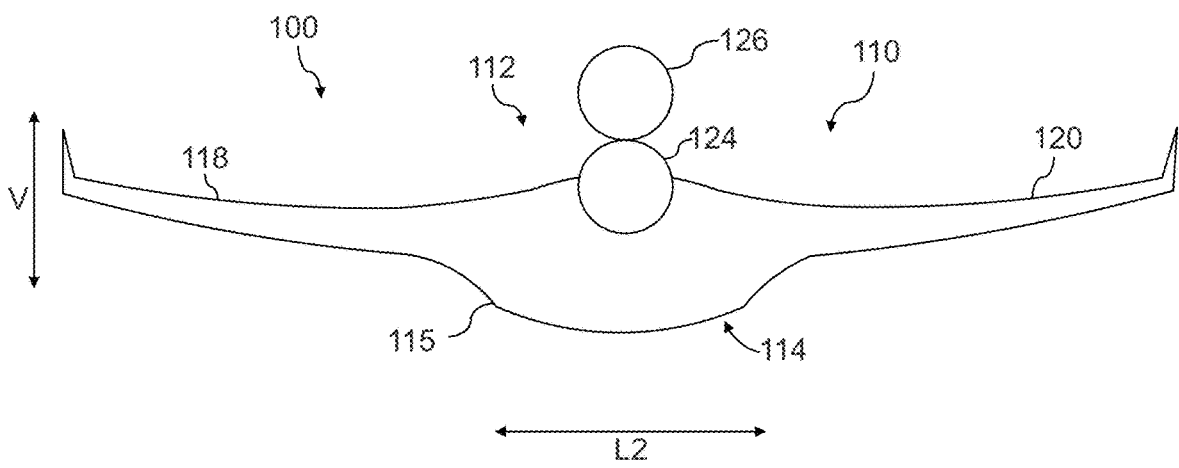
FIG. 13A is a forward-looking-aft, schematic view of an aircraft in accordance with another exemplary embodiment of the present disclosure.
Figure 13B:
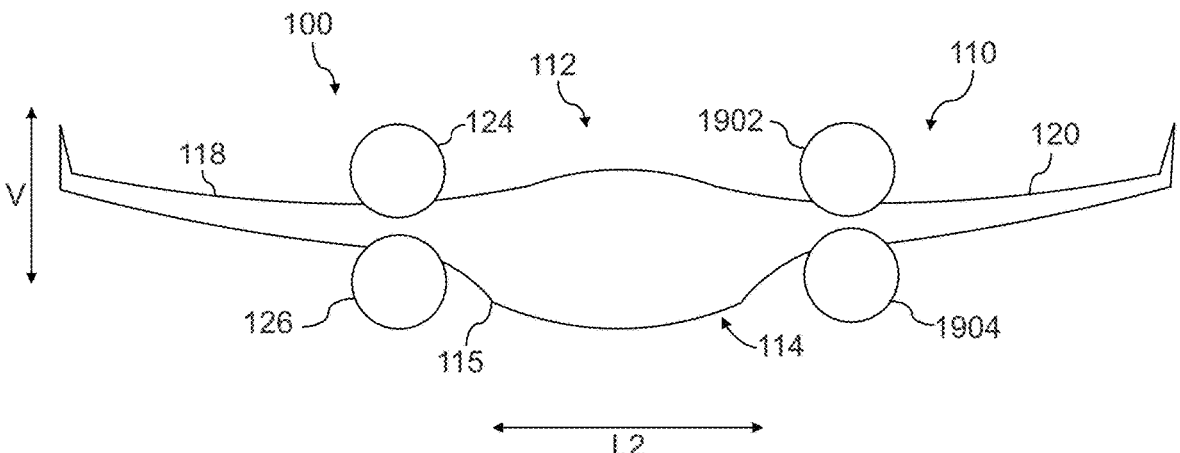
FIG. 13B is a forward-looking-aft, schematic view of an aircraft in accordance with another exemplary embodiment of the present disclosure.
Figure 13C:
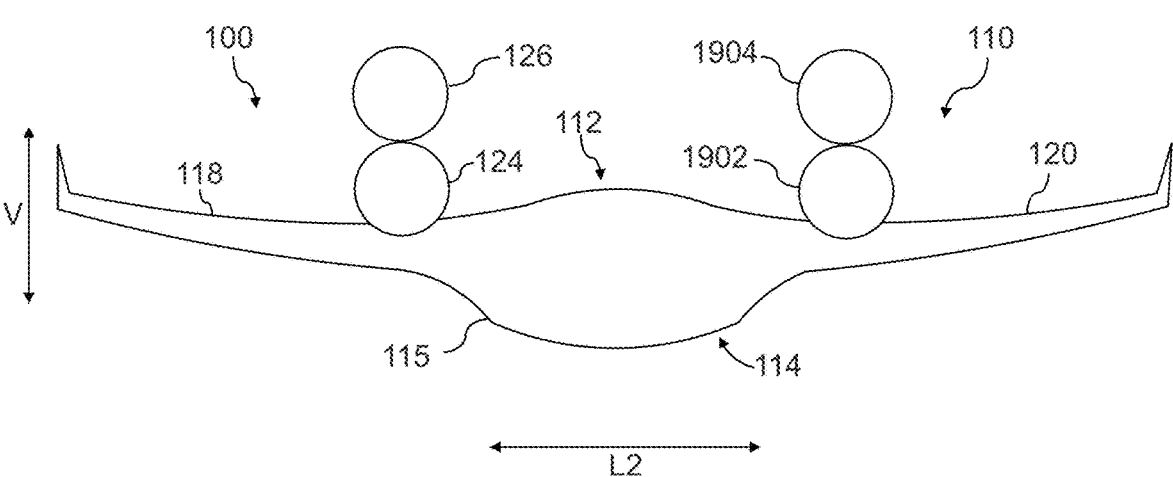
FIG. 13C is a forward-looking-aft, schematic view of an aircraft in accordance with another exemplary embodiment of the present disclosure.

Referring now to FIG. 13, which is presented in three subfigures, FIGS. 13A, 13B, and 13C, various exemplary embodiments of the present disclosure are depicted, showcasing different configurations of aircraft engines mounted to a body of an aircraft 100. These configurations illustrate the versatility and adaptability of engine placement in enhancing the operational efficiency and balance of the aircraft 100.

FIG. 13A provides a forward-looking-aft, schematic view of the aircraft 100, where a first engine 124 and a second engine 126 of the propulsion system are mounted in a stacked orientation along the vertical direction V on the top side 112 of the body 110 of the aircraft 100. This configuration aligns both engines 124, 126 along the longitudinal centerline (e.g., a central location along the lateral direction L2) of the aircraft 100, ensuring that the thrust generated by each engine is symmetrically distributed, which maintains stability and reduces the likelihood of thrust imbalance during engine failure events. The engines 124, 126 are positioned to optimize the ingestion of airflow, enhancing their efficiency and reducing aerodynamic drag.

In FIG. 13B, a forward-looking-aft, schematic view of another exemplary embodiment of the aircraft 100 is shown. In this configuration, the first engine 124 and the second engine 126 are mounted on a first side of the aircraft 100 above and below the first wing 118, respectively. Additionally, a third engine 1902 and a fourth engine 1904 are mounted above and below the second wing 120 on a second side of the aircraft 100, opposite the first side. This arrangement provides a balanced distribution of engine thrust across the aircraft 100, potentially reducing thrust imbalance in the event of an engine failure. By positioning the engines near the body 110, this configuration also leverages the structural strength of the body 110 and wings 118, 120 to support the weight and operation of the engines.

FIG. 13C illustrates a forward-looking-aft, schematic view of the aircraft 100 in another exemplary embodiment, where a first engine 124 and a second engine 126 are mounted above the first wing 118, and a third engine 1902 and a fourth engine 1904 are mounted above the second wing 120. This configuration places all engines on the top side 112 of the aircraft 100, enhancing an aerodynamic profile and reducing drag. Similar to FIG. 13B, this arrangement aims to distribute the weight and thrust of the engines evenly across the structure of the aircraft 100, which may improve stability and performance.

Referring now to FIGS. 14A-14E, a series of schematic views of additional aircraft 100 in accordance with various exemplary embodiments of the present disclosure are depicted. These views illustrate different configurations of engine placement on the respective aircraft 100.

Figure 14A:
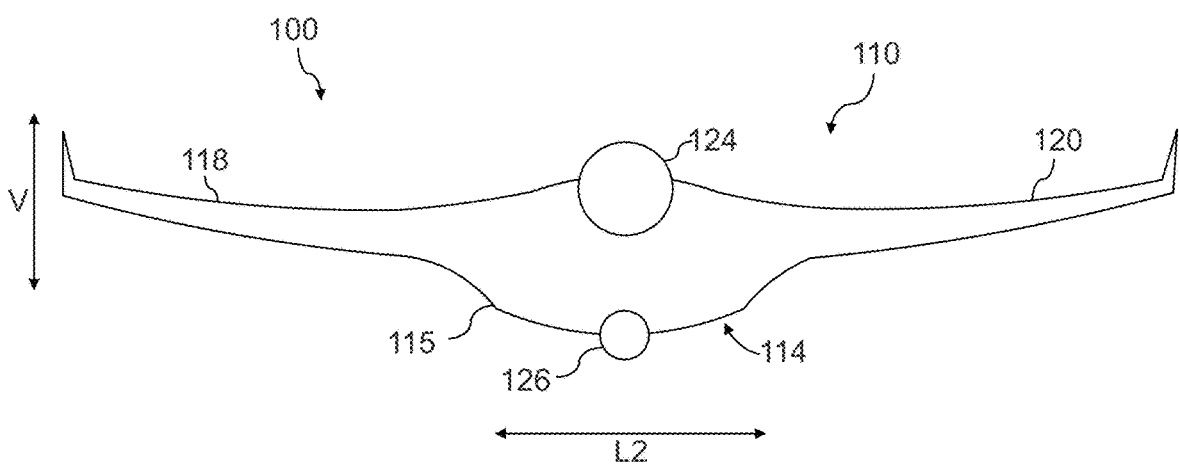
FIG. 14A is a forward-looking-aft, schematic view of an aircraft in accordance with another exemplary embodiment of the present disclosure.

FIG. 14A presents a forward-looking-aft, schematic view of an aircraft 100, where a first engine 124 is mounted on a top side 112 of the body 110 of the aircraft, and the second engine 126 is mounted on the bottom side 114. This configuration leverages a vertical direction V of the aircraft to optimize the distribution of engine thrust and the aircraft's aerodynamic profile. The first engine 124 serves as a primary propulsor, while the second engine 126 acts as a secondary, less powerful engine (indicated schematically by the relative sizes of the first and second engines 124, 126). The second engine 126 may be driven, at least in part, by the first engine 124, e.g., through a hybrid-electric power-sharing arrangement that enhances fuel efficiency and reduces operational costs. For example, the first engine 124 may drive an electric generator to produce electric power that is transferred at least in part to an electric motor of the second engine 126.

Figure 14B:
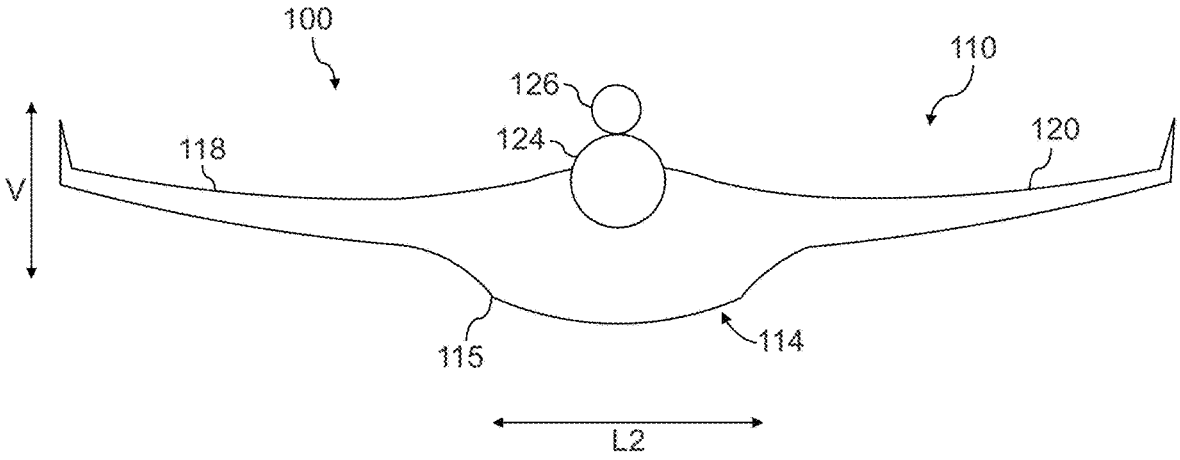
FIG. 14B is a forward-looking-aft, schematic view of an aircraft in accordance with another exemplary embodiment of the present disclosure.

In FIG. 14B, a similar configuration is provided as the embodiment of FIG. 14A, where both the first engine 124 and the second engine 126 are mounted on the top side 112 of the body 110 (similar to the embodiment of FIG. 13A).

Figure 14C:
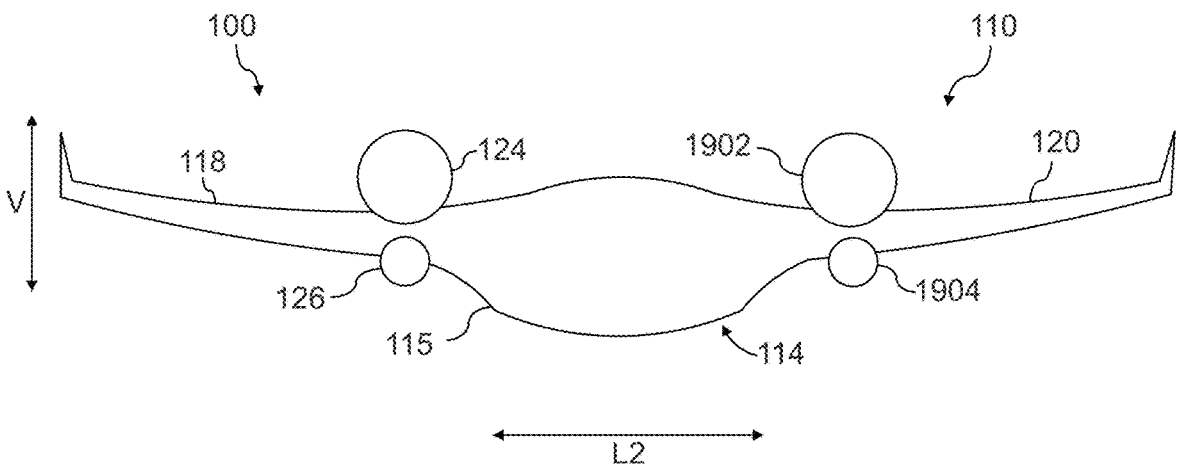
FIG. 14C is a forward-looking-aft, schematic view of an aircraft in accordance with another exemplary embodiment of the present disclosure.

FIG. 14C illustrates a configuration where two engines are mounted on a first side of the aircraft and two additional engines on a second side. Specifically, a first engine 124 and a third engine 1902 are mounted above and below the first wing 118, respectively, while a second engine 126 and a fourth engine 1904 are mounted above and below the second wing 120. This configuration allows for balanced thrust distribution across a structure of the aircraft, potentially enhancing stability and reducing the likelihood of performance degradation in the event of an engine failure. The first and third engines 124, 1902 are primary propulsors, and the second and fourth engines 126, 1904 serve as secondary engines (with the first engine 124 powering at least in part the fourth engine 1904 and the third engine 1902 powering at least in part the second engine 126)). In such a manner, in the event of an engine failure in a primary engine, thrust is reduced on both lateral sides of the aircraft 100.

Figure 14D:
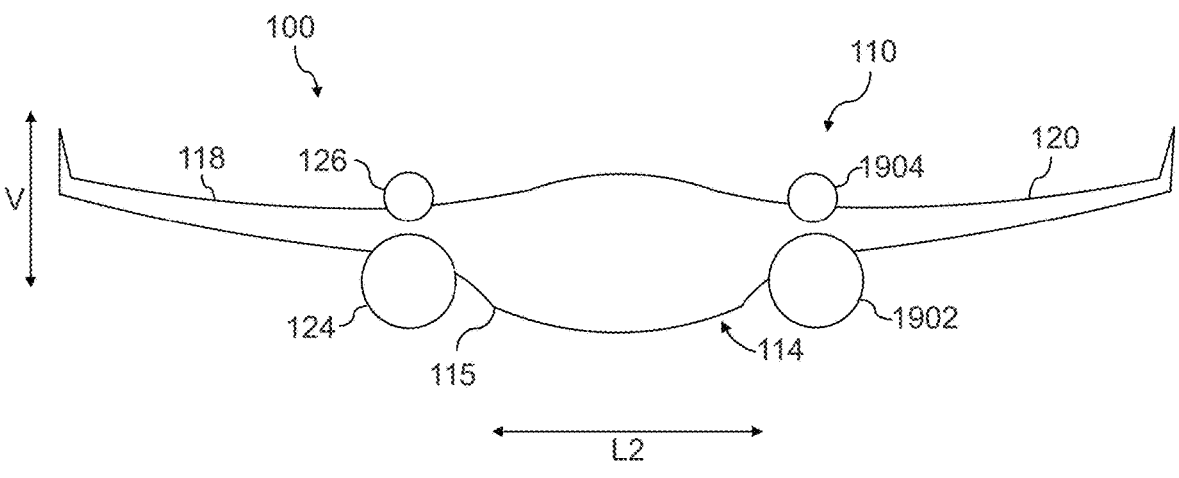
FIG. 14D is a forward-looking-aft, schematic view of an aircraft in accordance with another exemplary embodiment of the present disclosure.

FIG. 14D shows a similar configuration as in FIG. 14C, but inverts the positions of the primary and secondary engines. Such a configuration may provide a different angle of thrust for the aircraft.

Figure 14E:
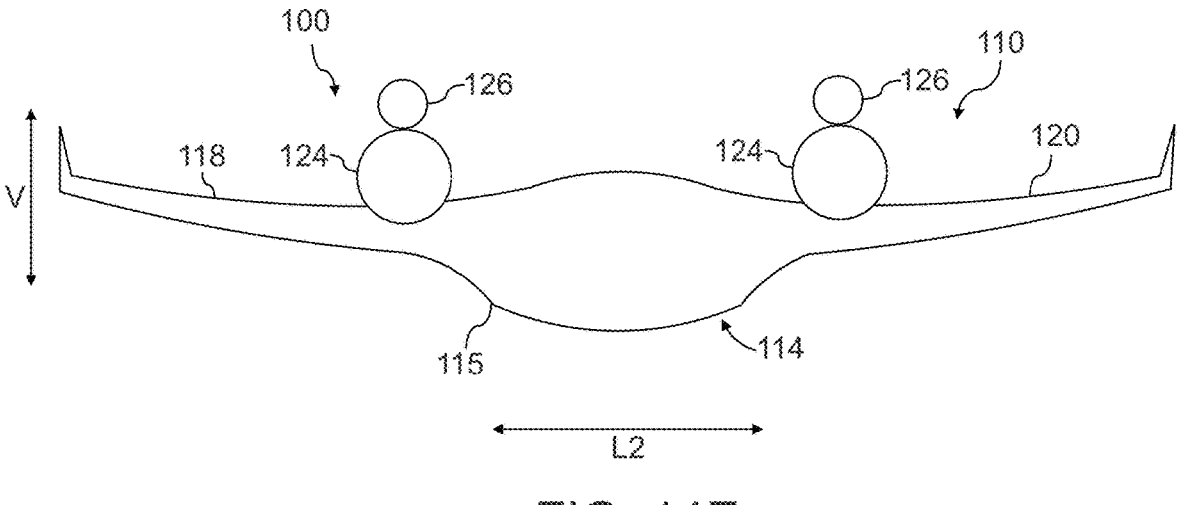
FIG. 14E is a forward-looking-aft, schematic view of an aircraft in accordance with another exemplary embodiment of the present disclosure.

Further, FIG. 14E, shows a configuration similar as those in FIGS. 14B and 14C in terms of engine placement, but positions all engines on the top sides of the respective wings 118, 120. Such a configuration may provide another angle of thrust for the aircraft.

Figure 15A:
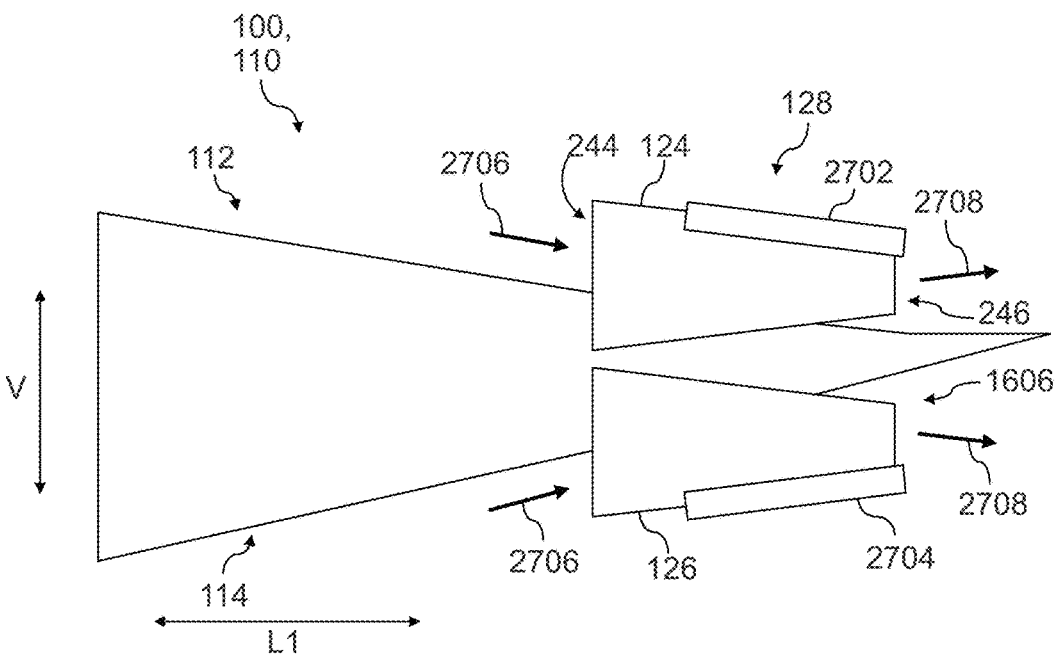
FIG. 15A is a schematic, close-up view of a first aircraft engine and a second aircraft engine of an aircraft in accordance with another exemplary embodiment of the present disclosure having a shared thrust reverser assembly in a stowed configuration.
Figure 15B:
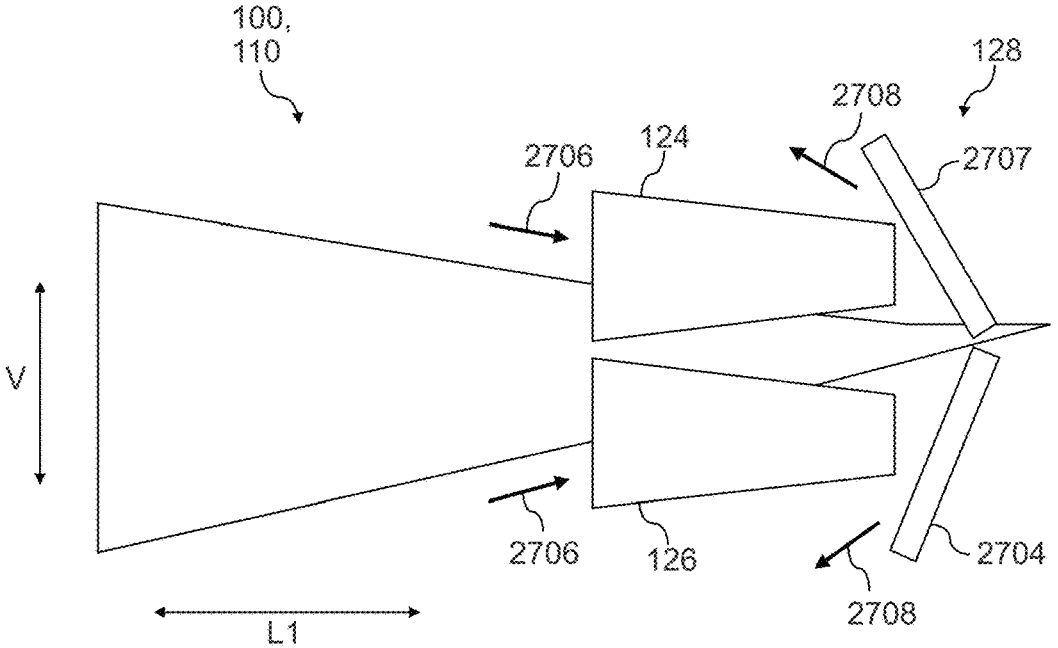
FIG. 15B is a schematic, close-up view of the first aircraft engine and the second aircraft engine of the exemplary aircraft of FIG. 15A having the shared thrust reverser assembly in a deployed configuration.

Referring now to FIG. 15, which is presented in two subfigures, FIGS. 15A and 15B, an exemplary embodiment of a blended wing aircraft 100 incorporating a shared thrust reverser assembly 128 is depicted. These figures illustrate the operational states of the shared thrust reverser assembly 128 in relation to a first aircraft engine 124 and a second aircraft engine 126, both mounted to the body 110 of the aircraft at the aft end 104 of the aircraft. The first and second aircraft engines 124, 126 may be mounted to a body 110 of the aircraft 100 in a similar manner as one or more of the first and second aircraft engines 124, 126 of, e.g., FIGS. 8, 9, 10, 11, or a combination thereof.

FIG. 15A provides a schematic, close-up view of the first aircraft engine 124 and the second aircraft engine 126 with the thrust reverser assembly 128 in a stowed configuration. In this configuration, the shared thrust reverser assembly 128 is not engaged, allowing the engines 124, 126 to function in a standard forward thrust mode. The engines 124, 126 are depicted as being vertically aligned along the vertical direction V, with the first aircraft engine 124 positioned above the second aircraft engine 126.

The thrust reverser assembly 128 includes a first thrust reverser clamshell door 2702 (which may be an upper clamshell door) and a second thrust reverser clamshell door 2704 (which may be a lower clamshell door). In the stowed configuration shown in FIG. 15A, both the first thrust reverser clamshell door 2702 and the second thrust reverser clamshell door 2704 are positioned such that they do not obstruct the engine exhausts 246, 1606, allowing the engines 124, 126 to expel exhaust gases 2708 in a manner typical of standard flight operations.

Referring now to FIG. 15B, a schematic, close-up view of the first aircraft engine 124 and the second aircraft engine 126 with the shared thrust reverser assembly 128 in a deployed configuration is illustrated. In this deployed state, the first thrust reverser clamshell door 2702 and the second thrust reverser clamshell door 2704 are activated to cover the engine exhausts 246, 1606 partially or fully. This configuration effectively redirects the exhaust airflow 2708 from a forward thrust (e.g., an aftward flowing direction as shown in FIG. 15A) to a reverse thrust.

The deployment of the first thrust reverser clamshell door 2702 and the second thrust reverser clamshell door 2704, as shown from FIG. 15A to FIG. 15B, allows the shared thrust reverser assembly 128 to serve both engines 124, 126 simultaneously. This shared configuration may simplify a mechanical complexity of the thrust reverser system and reduce weight and maintenance requirements by consolidating components that would otherwise be duplicated in separate systems for each engine.

Figure 16A:
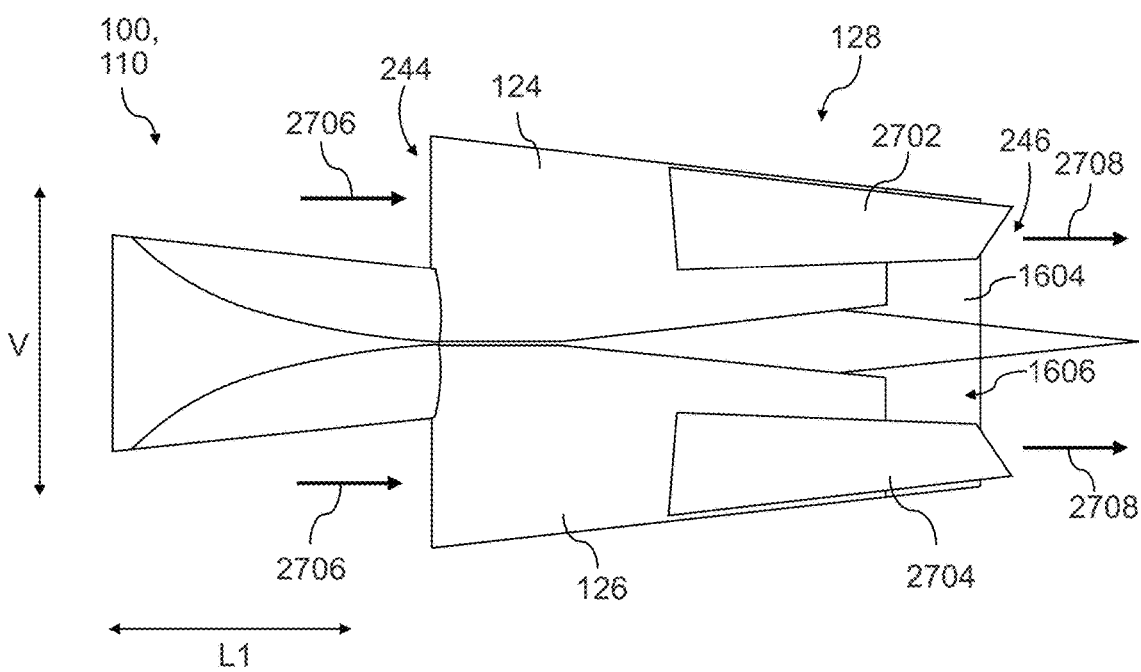
FIG. 16A is a schematic, close-up view of a first aircraft engine and a second aircraft engine of an aircraft in accordance with another exemplary embodiment of the present disclosure having a shared thrust reverser assembly in a stowed configuration.
Figure 16B:
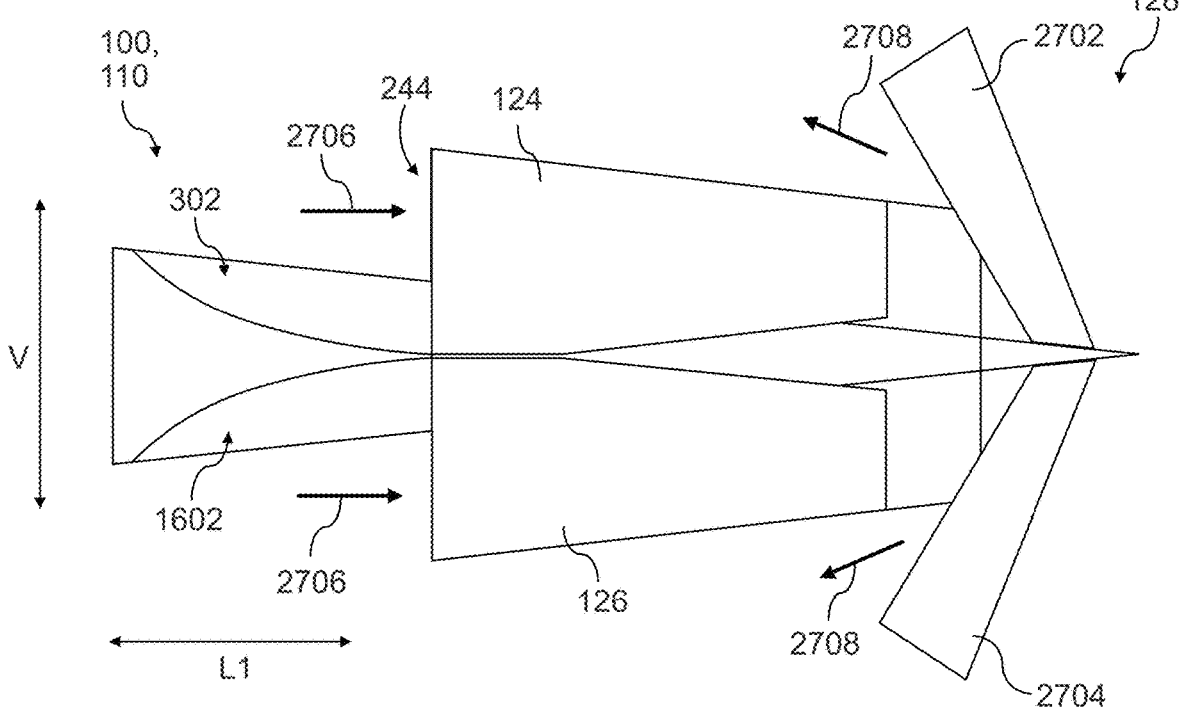
FIG. 16B is a schematic, close-up view of the first aircraft engine and the second aircraft engine of the exemplary aircraft of FIG. 16A having the shared thrust reverser assembly in a deployed configuration.

Referring now to FIG. 16, which is presented in two subfigures, FIGS. 16A and 16B, an exemplary embodiment of a blended wing aircraft 100 incorporating a shared thrust reverser assembly 128 is depicted. The embodiment of FIG. 16 may be configured in substantially the same manner as the exemplary embodiment of FIG. 15. However, for the embodiment of FIG. 16, the aircraft 100 further includes a common outer nacelle 1604, with both a first thrust reverser clamshell door 2702 and a second thrust reverser clamshell door 2704 of the shared thrust reverser assembly 128 coupled to, or integrated into, the common outer nacelle 1604.

Figure 17:
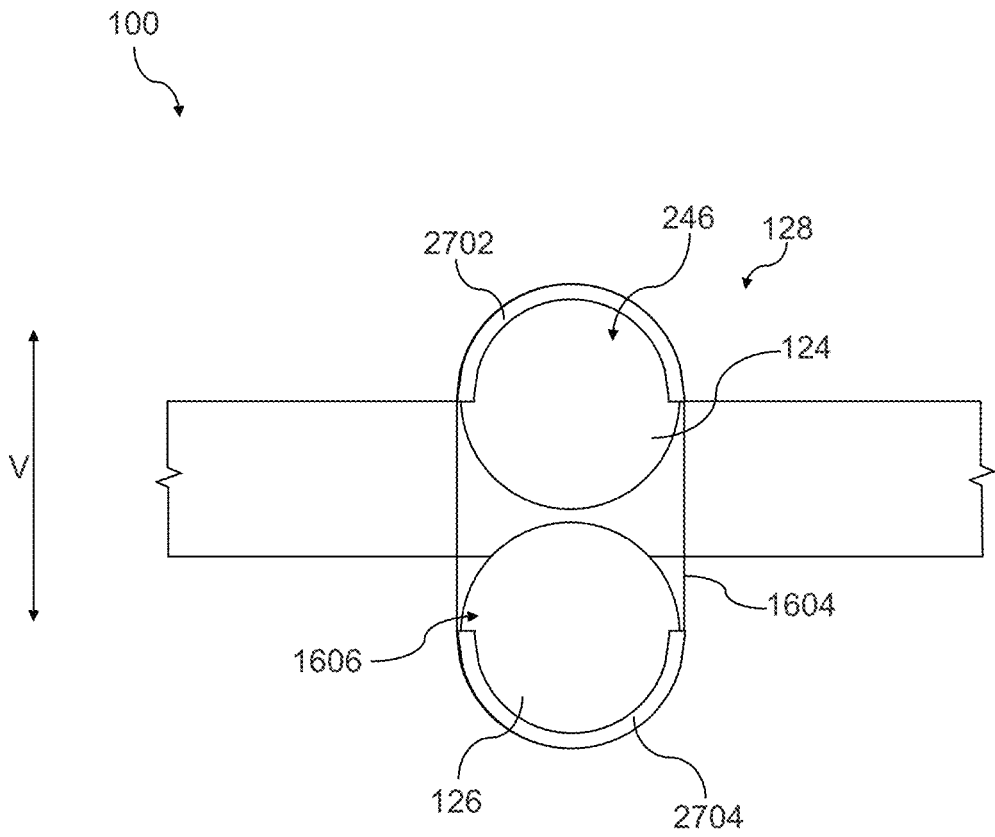
FIG. 17 is an axial view of the shared outer nacelle of the exemplary aircraft of FIG. 16.

Referring now to FIG. 17, an aft-looking forward view of the first and second aircraft engines 124, 126, and shared outer nacelle 1604, of the exemplary aircraft of FIG. 16, is illustrated. In the embodiment of FIG. 17, the shared thrust reverser assembly 128 is in the stowed position. As noted above, the shared thrust reverser assembly 128 coupled to, or integrated into, the common outer nacelle 1604.

The common outer nacelle 1604 may provide a unified structural enclosure for both engines and may also support the functional integration of the shared thrust reverser assembly 128.

Figure 18:
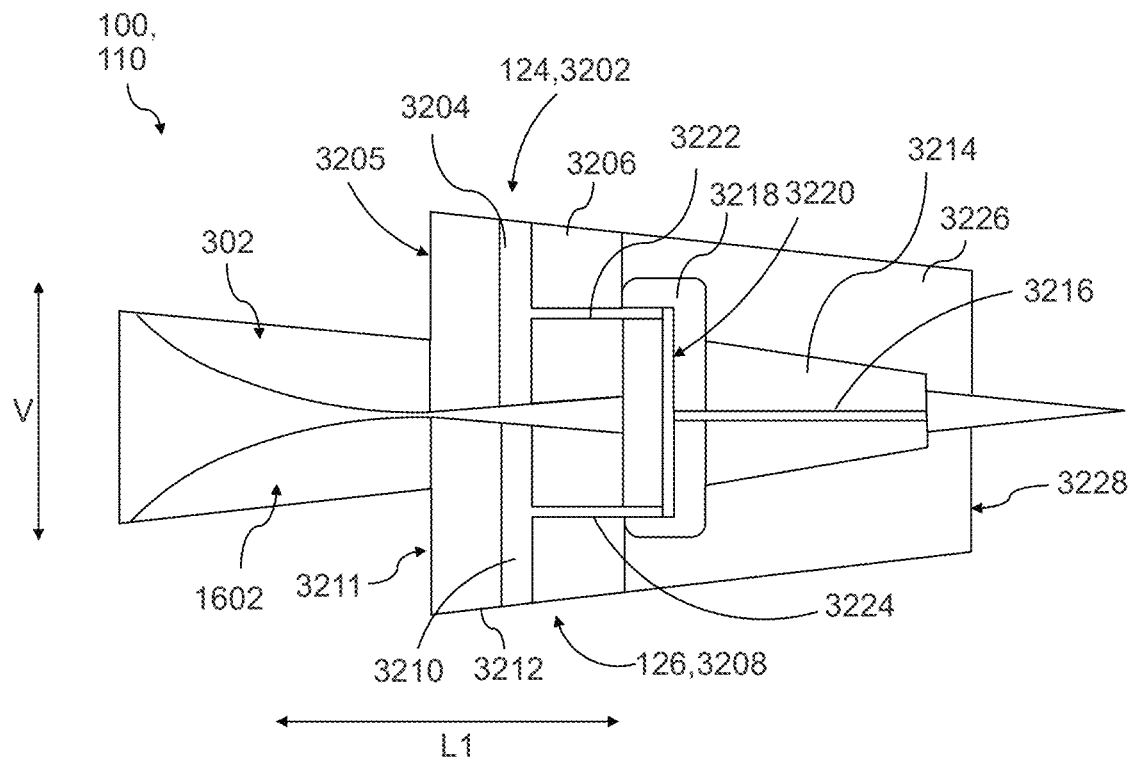
FIG. 18 is a schematic, close-up view of a first aircraft engine and a second of an aircraft engine in accordance with another exemplary embodiment of the present disclosure having a shared power source.

Referring now to FIG. 18, a schematic, close-up view of a first aircraft engine 124 and a second aircraft engine 126 in accordance with another exemplary embodiment of the present disclosure is provided. The exemplary first and second aircraft engines 124, 126 may be configured in a similar manner as one or more of the exemplary embodiments described herein above.

However, for the embodiment of FIG. 18, the aircraft further includes a shared power source 3214 for the first and second aircraft engines 124, 126, along with a common outer nacelle 3226. In particular, the first aircraft engine 124 is configured as a first propulsor 3202 and the second aircraft engine 126 is configured as a second propulsor 3208. The first propulsor 3202 and the second propulsor 3208 are each equipped with a fan 3204, 3210, respectively, for generating thrust for aircraft operation.

The fans 3204, 3210 of the first and second propulsors 3202, 3208 draw air through respective fan inlets 3205, 3211. These inlets 3205, 3211 are positioned to intake ambient air, which is then accelerated and expelled through respective fan ducts 3206, 3212 of the first and second propulsors 3202, 3208.

In the exemplary embodiment of FIG. 18, the shared power source 3214, is configured to provide mechanical power to both the first and second propulsors 3202, 3208. The power source 3214 may be configured as a turbomachine (similar to, e.g., the turbomachine 202 in FIG. 2) configured to receive airflow from one or both of the fans 3204, 3210 and fan ducts 3206, 3212.

The aircraft 100 further includes a gearbox 3218 and the first and second propulsors 3202, 3208 include a first fan shaft 3222 and a second fan shaft 3224, respectively. The shared power source 3214 is coupled to the first and second propulsors 3202, 3208 via a drive shaft 3216 (e.g., an output shaft/low pressure shaft), across the gearbox 3218. The gearbox 3218 houses one or more gears 3220 for transferring power from the drive shaft 3216 to the first and second fan shafts 3222, 3224. The gearbox 3218 may optionally adjust a rotational speed of the first and second fan shafts 3222, 3224 relative to the drive shaft 3216.

The common nacelle 3226 encloses components of both the first and second propulsors 3202, 3208, providing a streamlined and protective housing that enhances the aerodynamic profile of the aircraft 100. This common nacelle 3226 may integrate with the body 110 of the aircraft, contributing to a reduced aerodynamic drag. More specifically, for the embodiment depicted, the fan ducts 3206, 3212 each exhaust into the common nacelle 3226.

The common nacelle further defines an exhaust 3228 that provides for the expulsion of gases generated during the propulsion process and a fan flow from both the fans 3204, 3210.

Figure 19:
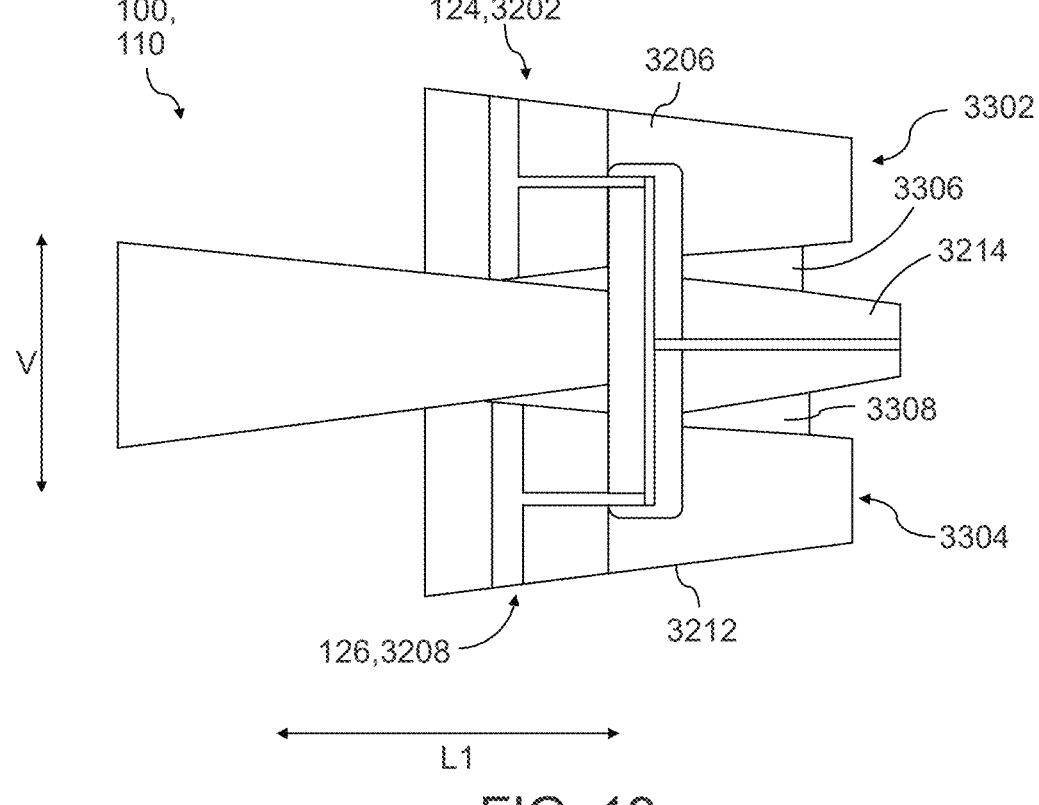
FIG. 19 is a schematic, close-up view of a first aircraft engine and a second of an aircraft engine in accordance with yet another exemplary embodiment of the present disclosure having a shared power source.

In sum, FIG. 18 provides an embodiment that may enhance an efficiency and functionality of the propulsion system of the aircraft Referring briefly now to FIG. 19, a schematic, close-up view of a first aircraft engine 124 (configured as a first propulsor 3202) and a second aircraft engine 126 (configured as a second propulsor 3208) in accordance with yet another exemplary embodiment of the present disclosure having a shared power source 3214 is depicted. The exemplary embodiment of FIG. 19 may be configured in a similar manner as the exemplary embodiment of FIG. 18. However, for the embodiment of FIG. 19, The aircraft 100 does not include a common outer nacelle surrounding a fan duct 3206 of the first propulsor 3202 and a fan duct 3212 of the second propulsor 3208. Instead, for the embodiment of FIG. 19, the first and second fan ducts 3206, 3212 are coupled to the shared power source 3214 through a first propulsor mount 3306 and a second propulsor mount 3308, respectively. With such a configuration, the first fan duct 3306 defines a first propulsor fan exhaust 3302 and the second fan duct 3312 defines a second propulsor fan exhaust 3304, with the second propulsor fan exhaust 3304 being separate from, and spaced apart from, the first propulsor fan exhaust 3302.

The present disclosure provides for a blended wing aircraft having a body with a fuselage and a pair of wings extending outward from the fuselage. The blended wing aircraft further includes an aircraft engine defining an outlet and including a thrust reverser assembly, the thrust reverser assembly includes a deployable structure extending less than 360 degrees around the outlet. As noted above, the inventors of the present disclosure found that aspects of the present disclosure provide for desired thrust reverse for the aircraft despite the mounting location of the aircraft engine against the body.

Further aspects are provided by the subject matter of the following clauses:

A blended wing aircraft comprising: a body having a fuselage and a pair of wings extending outward from the fuselage; and an aircraft engine defining an outlet and comprising a thrust reverser assembly, the thrust reverser assembly comprising a deployable structure extending less than 360 degrees around the outlet.

The blended wing aircraft of any of the preceding clauses, wherein the aircraft engine is mounted to a top side of the body.

The blended wing aircraft of any of the preceding clauses, wherein the body defines a trailing edge and a flowpath surface, wherein the aircraft engine is mounted at the trailing edge, and wherein the flowpath surface defines an inlet channel for the aircraft engine.

The blended wing aircraft of any of the preceding clauses, wherein the deployable structure is a clamshell door moveable between a forward thrust position and a reverse thrust position, wherein the clamshell door is positioned over at least a portion of the outlet when in the reverse thrust position.

The blended wing aircraft of any of the preceding clauses, wherein the body defines a flowpath surface, and wherein the clamshell door contacts the flowpath surface downstream of the outlet when in the reverse thrust position.

The blended wing aircraft of any of the preceding clauses, wherein the aircraft engine is a gas turbine engine having a turbomachine and an outer nacelle surrounding at least in part the turbomachine to define a bypass passage, wherein the outlet is defined by the outer nacelle.

The blended wing aircraft of any of the preceding clauses, wherein the clamshell door is coupled to the outer nacelle.

The blended wing aircraft of any of the preceding clauses, wherein the turbomachine defines an exhaust, wherein the clamshell door defines a cutout downstream of the exhaust when in the reverse thrust position.

The blended wing aircraft of any of the preceding clauses, wherein the turbomachine defines an exhaust, wherein the body defines a flowpath surface, and wherein the clamshell door forms a seal with the flowpath surface downstream of the exhaust when in the reverse thrust position.

The blended wing aircraft of any of the preceding clauses, wherein the deployable structure is a translating cowl moveable between a forward thrust position and a reverse thrust position.

The blended wing aircraft of any of the preceding clauses, wherein the aircraft engine is a gas turbine engine having a turbomachine and an outer nacelle surrounding at least in part the turbomachine, and wherein the translating cowl is incorporated into the outer nacelle.

The blended wing aircraft of any of the preceding clauses, wherein the outer nacelle defines a bypass passage with the turbomachine, and wherein the thrust reverser assembly further comprises one or more blocker doors moveable into the bypass passage when the translating cowl is in the reverse thrust position.

The blended wing aircraft of any of the preceding clauses, wherein the body defines a flowpath surface, and wherein the translating cowl extends from a first end to a second end, wherein the first end is adjacent to the flowpath surface on a first side of the aircraft engine and the second end is adjacent to the flowpath surface on a second side of the aircraft engine.

The blended wing aircraft of any of the preceding clauses, wherein the body defines a top side and a bottom side, wherein the aircraft engine is mounted on the top side, and wherein the body further defines a reverse thrust passage extending from the aircraft engine to the bottom side when the translating cowl is in the reverse thrust position.

The blended wing aircraft of any of the preceding clauses, wherein the reverse thrust passage is oriented in a forward direction.

An aircraft engine for a blended wing aircraft, the aircraft engine comprising: an outer nacelle defining an outlet, the outer nacelle configured to be positioned adjacent to a body of the aircraft when the aircraft engine is installed on the body of the aircraft; and a thrust reverser assembly coupled to the outer nacelle, the thrust reverser assembly comprising a deployable structure extending less than 360 degrees around the outlet.

The aircraft engine of any of the preceding clauses, wherein the deployable structure is a clamshell door moveable between a forward thrust position and a reverse thrust position, wherein the clamshell door is positioned over at least a portion of the outlet when in the reverse thrust position.

The aircraft engine of any of the preceding clauses, wherein the aircraft engine is a gas turbine engine having a turbomachine and an outer nacelle surrounding at least in part the turbomachine to define a bypass passage, wherein the outlet is defined by the outer nacelle.

The aircraft engine of any of the preceding clauses, wherein the deployable structure is a translating cowl moveable between a forward thrust position and a reverse thrust position.

The aircraft engine of any of the preceding clauses, wherein the aircraft engine is a gas turbine engine having a turbomachine and an outer nacelle surrounding at least in part the turbomachine to define a bypass passage, wherein the translating cowl is coupled to or integrated with the outer nacelle, and wherein the thrust reverser assembly further comprises one or more blocker doors moveable into the bypass passage when the translating cowl is in the reverse thrust position.

A blended wing aircraft defining a vertical direction, the blended wing aircraft comprising: a body having a fuselage and a pair of wings extending outward from the fuselage; a first aircraft engine mounted to the body and defining an inlet positioned to ingest a boundary layer airflow over the body during operation of the blended wing aircraft; and a second aircraft engine also mounted to the body and arranged in a stacked orientation along the vertical direction with the first aircraft engine.

The blended wing aircraft of any of the preceding clauses, further defining a longitudinal centerline, wherein the first and second aircraft engines are aligned with the longitudinal centerline.

The blended wing aircraft of any of the preceding clauses, further defining a top side and a bottom side, wherein the first aircraft engine is mounted to the body on the top side, wherein the second aircraft engine is mounted to the body on the bottom side.

The blended wing aircraft of any of the preceding clauses, wherein second aircraft engine defines a second inlet positioned to ingest a second boundary layer airflow over the body during operation of the blended wing aircraft.

The blended wing aircraft of any of the preceding clauses, wherein the body defines a trailing edge and a flowpath surface, wherein the first aircraft engine and second aircraft engine are each mounted at the trailing edge, and wherein the flowpath surface defines a first inlet channel for the first aircraft engine and a second inlet channel for the second aircraft engine.

The blended wing aircraft of any of the preceding clauses, further comprising: a thrust reverser assembly operable with the first aircraft engine and the second aircraft engine.

The blended wing aircraft of any of the preceding clauses, wherein the thrust reverser assembly comprises an upper clamshell door and a lower clamshell door, wherein the upper clamshell door and the lower clamshell door are each moveable between a forward thrust position and a reverse thrust position, wherein the upper clamshell door is positioned over at least a portion of an outlet of the first aircraft engine when in the reverse thrust position, and wherein the lower clamshell door is positioned over at least a portion of an outlet of the second aircraft engine when in the reverse thrust position.

The blended wing aircraft of any of the preceding clauses, wherein the aircraft engine is a primary propulsor, and wherein the second aircraft engine is a secondary propulsor.

The blended wing aircraft of any of the preceding clauses, further comprising: a third aircraft engine mounted to the body; and a fourth aircraft engine mounted to the body and arranged in a stacked orientation along the vertical direction with the third aircraft engine.

The blended wing aircraft of any of the preceding clauses, further defining a lateral direction, and wherein the first and second aircraft engines and the third and fourth aircraft engines are spaced apart along the lateral direction.

The blended wing aircraft of any of the preceding clauses, wherein the first and third aircraft engines are primary propulsors, and wherein the second and fourth aircraft engines are secondary propulsors.

The blended wing aircraft of any of the preceding clauses, wherein the second aircraft engine is powered at least in part by the third aircraft engine, and wherein the fourth aircraft engine is powered at least in part by the first aircraft engine.

The blended wing aircraft of any of the preceding clauses, further defining a top side and a bottom side, wherein the first aircraft engine and the second engine are each mounted to the body on the top side.

The blended wing aircraft of any of the preceding clauses, wherein the first aircraft engine comprises a first turbomachine, wherein the second aircraft engine comprises a second turbomachine, and wherein the blended wing aircraft further comprises a shared outer nacelle surrounding at least in part the first turbomachine and the second turbomachine.

The blended wing aircraft of any of the preceding clauses, wherein the first aircraft engine is a first propulsor, wherein the second aircraft engine is a second propulsor, and wherein the blended wing aircraft further comprises a power source coupled to the first propulsor and the second propulsor for driving the first propulsor and the second propulsor.

The blended wing aircraft of any of the preceding clauses, wherein the power source comprises a turbomachine and a gearbox to provide mechanical power to the first propulsor and the second propulsor to drive the first propulsor and second propulsor.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A blended wing aircraft comprising:
a body having a fuselage and a pair of wings extending outward from the fuselage; and
an aircraft engine defining an outlet and comprising a thrust reverser assembly, the thrust reverser assembly comprising a deployable structure extending less than 360 degrees around the outlet, wherein the aircraft engine comprises a turbomachine and an outer nacelle surrounding at least in part the turbomachine to define a bypass passage, wherein the deployable structure is a clamshell door moveable between a forward thrust position and a reverse thrust position, wherein the clamshell door is positioned over at least a portion of the outlet when in the reverse thrust position and wherein the outlet is defined by the outer nacelle, and wherein the turbomachine defines an exhaust, and wherein the clamshell door defines a cutout downstream of the exhaust when in the reverse thrust position.

2. The blended wing aircraft of claim 1, wherein the aircraft engine is mounted to a top side of the body.

3. The blended wing aircraft of claim 1, wherein the body defines a trailing edge, wherein the aircraft engine is mounted at the trailing edge.

4. The blended wing aircraft of claim 1, wherein the body defines a flowpath surface, and wherein the clamshell door contacts the flowpath surface downstream of the outlet when in the reverse thrust position.

5. The blended wing aircraft of claim 1, wherein the clamshell door is coupled to the outer nacelle.

6. The blended wing aircraft of claim 1, wherein the body defines a flowpath surface, and wherein at least a portion of the clamshell door forms a seal with the flowpath surface downstream of the exhaust when in the reverse thrust position.

7. The blended wing aircraft of claim 1, wherein at least a portion of the clamshell door forms a seal with a flowpath surface defined by the body of the aircraft when the aircraft engine is installed on the body of the aircraft downstream of the exhaust when in the reverse thrust position.

8. An aircraft engine for a blended wing aircraft, the aircraft engine comprising:
an outer nacelle defining an outlet, the outer nacelle configured to be positioned adjacent to a body of the aircraft when the aircraft engine is installed on the body of the aircraft; and a thrust reverser assembly coupled to the outer nacelle, the thrust reverser assembly comprising a deployable structure extending less than 360 degrees around the outlet; and a turbomachine, wherein the outer nacelle surrounds at least in part the turbomachine to define a bypass passage, wherein the deployable structure is a clamshell door moveable between a forward thrust position and a reverse thrust position, wherein the clamshell door is positioned over at least a portion of the outlet when in the reverse thrust position, and wherein the turbomachine defines an exhaust, and wherein the clamshell door defines a cutout downstream of the exhaust when in the reverse thrust position.

9. The aircraft engine of claim 8, wherein the clamshell door is configured to contact a flowpath surface defined by the body of the aircraft when the aircraft engine is installed on the body of the aircraft downstream of the outlet when in the reverse thrust position.

10. The blended wing aircraft of claim 8, wherein the clamshell door is coupled to the outer nacelle.

11. A blended wing aircraft comprising:

a body having a fuselage and a pair of wings extending outward from the fuselage; and an aircraft engine defining an outlet and comprising a thrust reverser assembly, the thrust reverser assembly comprising a deployable structure extending less than 360 degrees around the outlet, wherein the deployable structure is a translating cowl moveable between a forward thrust position and a reverse thrust position, wherein the body defines a top side and a bottom side, wherein the aircraft engine is mounted on the top side, and wherein the body further defines a reverse thrust passage extending from the aircraft engine to the bottom side when the translating cowl is in the reverse thrust position.

12. The blended wing aircraft of claim 11, wherein the reverse thrust passage is oriented in a forward direction.

13. The blended wing aircraft of claim 11, wherein the body defines a flowpath surface, and wherein the translating cowl extends from a first end to a second end, wherein the first end is adjacent to the flowpath surface on a first side of the aircraft engine and the second end is adjacent to the flowpath surface on a second side of the aircraft engine.

14. The blended wing aircraft of claim 11, wherein the aircraft engine is a gas turbine engine having a turbomachine and an outer nacelle surrounding at least in part the turbomachine, and wherein the translating cowl is incorporated into the outer nacelle.

15. The blended wing aircraft of claim 14, wherein the outer nacelle defines a bypass passage with the turbomachine, and wherein the thrust reverser assembly further comprises one or more blocker doors moveable into the bypass passage when the translating cowl is in the reverse thrust position.

\* \* \* \* \*